(12) United States Patent
Wu

(10) Patent No.: US 12,367,225 B2
(45) Date of Patent: Jul. 22, 2025

(54) DATA PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Yuanye Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/575,162

(22) PCT Filed: Aug. 5, 2022

(86) PCT No.: PCT/CN2022/110633
§ 371 (c)(1),
(2) Date: Dec. 28, 2023

(87) PCT Pub. No.: WO2023/011645
PCT Pub. Date: Feb. 9, 2023

(65) Prior Publication Data
US 2025/0036661 A1      Jan. 30, 2025

(30) Foreign Application Priority Data
Aug. 6, 2021   (CN) .......................... 202110903063.8

(51) Int. Cl.
*G06F 16/00*      (2019.01)
*G06F 16/23*      (2019.01)
(Continued)

(52) U.S. Cl.
CPC ........ *G06F 16/288* (2019.01); *G06F 16/2358* (2019.01); *G06F 16/27* (2019.01)

(58) Field of Classification Search
None
See application file for complete search history.

(56) References Cited

U.S. PATENT DOCUMENTS

| 7,107,282 B1 * | 9/2006 | Yalamanchi | ............ G06F 16/21 |
| | | | 707/999.102 |
| 9,600,180 B2 * | 3/2017 | Geddam | ............... G06F 3/0685 |

(Continued)

FOREIGN PATENT DOCUMENTS

| CN | 101022366 A | * | 8/2007 |
| CN | 105187297 A | | 12/2015 |

(Continued)

OTHER PUBLICATIONS

International Search Report and Written Opinion of the International Searching Authority received for PCT Patent Application No. PCT/CN2022/110633, mailed on Nov. 3, 2022, 8 pages.

*Primary Examiner* — Hasanul Mobin
(74) *Attorney, Agent, or Firm* — Astute IP Law Group

(57) ABSTRACT

A data processing method, a data processing apparatus, an electronic device, and a storage medium are provided. The data processing method includes: creating a first management item for a first entity object and binding the first entity object to the first management item, the first management item including first change information of the first entity object; creating at least one second management item for at least one second entity object, respectively, and binding the second entity object to the second management item, each second management item including second change information of a corresponding second entity object; establishing, based on a logical relationship between the first entity object and the second entity object, a first hierarchical relationship between the first management item and the second management item; and maintaining the first hierarchical relationship according to the logical relationship between the first entity object and the second entity object.

23 Claims, 9 Drawing Sheets

(51) Int. Cl.
  *G06F 16/27* (2019.01)
  *G06F 16/28* (2019.01)

(56) References Cited

U.S. PATENT DOCUMENTS

| | | | |
|---|---|---|---|
| 11,157,519 B2 * | 10/2021 | Ciliberti, III | G06Q 10/0631 |
| 2006/0195798 A1 * | 8/2006 | Chan | G06N 5/04 |
| | | | 717/112 |
| 2009/0138415 A1 * | 5/2009 | Lancaster | G06N 5/04 |
| | | | 706/11 |
| 2009/0254572 A1 * | 10/2009 | Redlich | G06Q 10/10 |
| 2011/0131252 A1 * | 6/2011 | Son | H04L 41/12 |
| | | | 707/E17.005 |
| 2012/0197809 A1 | 8/2012 | Earl et al. | |
| 2013/0204841 A1 * | 8/2013 | Obusek | G06F 11/2097 |
| | | | 707/624 |
| 2014/0059196 A1 * | 2/2014 | Onffroy | H04L 41/022 |
| | | | 709/223 |
| 2015/0113462 A1 * | 4/2015 | Chen | G06Q 10/06 |
| | | | 715/771 |
| 2015/0249684 A1 * | 9/2015 | Zhang | G06F 3/0484 |
| | | | 726/1 |
| 2016/0036872 A1 * | 2/2016 | Lappin | H04L 12/185 |
| | | | 709/204 |
| 2018/0277246 A1 * | 9/2018 | Zhong | A61B 5/746 |
| 2019/0222597 A1 * | 7/2019 | Crabtree | H04L 63/1425 |
| 2020/0412729 A1 * | 12/2020 | Zhou | G06F 21/6209 |
| 2023/0316945 A1 * | 10/2023 | Lee | G06T 15/10 |
| 2025/0036661 A1 * | 1/2025 | Wu | G06Q 10/101 |

FOREIGN PATENT DOCUMENTS

| | | | | |
|---|---|---|---|---|
| CN | 106603391 A | | 4/2017 | |
| CN | 111385186 A | | 7/2020 | |
| CN | 112785248 A | | 5/2021 | |
| JP | 4493505 B2 * | | 6/2010 | G06Q 10/06 |

* cited by examiner

DATA PROCESSING METHOD AND APPARATUS, ELECTRONIC DEVICE, AND STORAGE MEDIUM

CROSS REFERENCE TO RELATED APPLICATIONS

This is a national stage application based on International Patent Application No. PCT/CN2022/110633, filed Aug. 5, 2022, which claims priority to Chinese Patent Application No. 202110903063.8, filed on Aug. 6, 2021, the disclosures of which are incorporated herein by reference in their entireties.

TECHNICAL FIELD

Embodiments of the present disclosure relate to a data processing method, a data processing apparatus, an electronic device, and a storage medium.

BACKGROUND

The data structure is a way of organizing and storing data in computers. The data structure is a collection of data elements that have one or more specific relationships with each other. Generally, a carefully chosen data structure may lead to higher operational or storage efficiency.

For high-level applications such as the social network or online office applications, the chosen data structures and relationships between the data structures may affect the operational efficiency or flexibility of the high-level applications based on the data structures.

SUMMARY

At least one embodiment of the present disclosure provides a data processing method, and the data processing method includes: creating a first management item for a first entity object and binding the first entity object to the first management item, where the first management item comprises first change information of the first entity object; creating at least one second management item for at least one second entity object, respectively, and binding the at least one second entity object to the at least one second management item, respectively, where each of the at least one second management item comprises second change information of a corresponding second entity object; establishing, based on a logical relationship between the first entity object and the at least one second entity object, a first hierarchical relationship between the first management item and the at least one second management item; and maintaining the first hierarchical relationship according to the logical relationship between the first entity object and the at least one second entity object.

At least one embodiment of the present disclosure further provides a data processing apparatus, and the data processing apparatus includes a first management item processing unit, a second management item processing unit, a hierarchical relationship establishing unit, and a hierarchical relationship maintaining unit; the first management item processing unit is configured to create a first management item for a first entity object and bind the first entity object to the first management item, wherein the first management item comprises first change information of the first entity object; the second management item processing unit is configured to create at least one second management item for at least one second entity object, respectively, and bind the at least one second entity object to the at least one second management item, respectively, wherein each of the at least one second management item comprises second change information of a corresponding second entity object; the hierarchical relationship establishing unit is configured to establish, based on a logical relationship between the first entity object and the at least one second entity object, a first hierarchical relationship between the first management item and the at least one second management item; and the hierarchical relationship maintaining unit is configured to maintain the first hierarchical relationship according to the logical relationship between the first entity object and the at least one second entity object.

At least one embodiment of the present disclosure further provides an electronic device, and the electronic device includes a processor and a memory; the memory includes one or more computer-executable instructions; the one or more computer-executable instructions are stored on the memory and configured to be executed by the processor; and the one or more computer-executable instructions are configured to implement the data processing method according to any one of the embodiments of the present disclosure.

At least one embodiment of the present disclosure further provides a storage medium, the storage medium is configured to store non-transitory computer-executable instructions, and the non-transitory computer-executable instructions, when executed by a processor, cause the processor to implement the data processing method according to any one of the embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
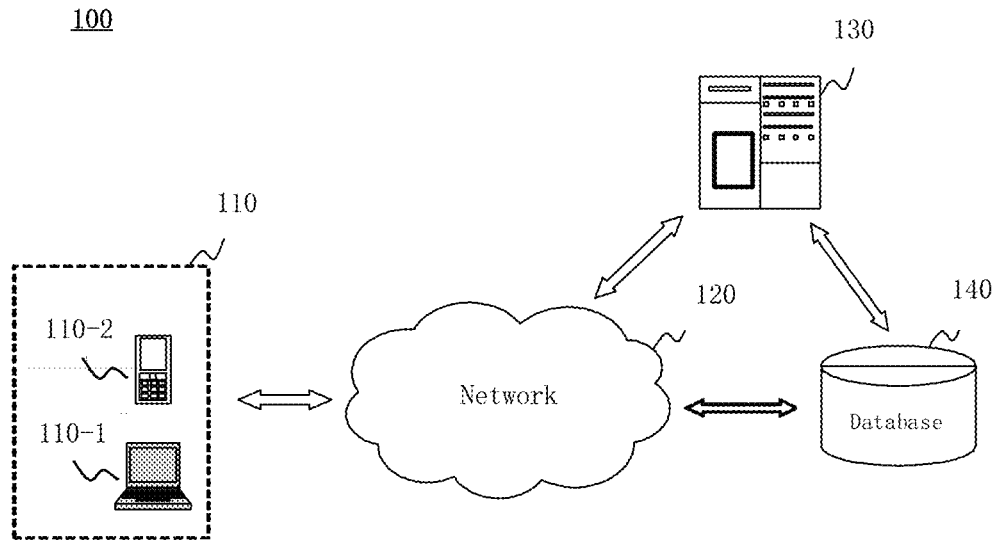
FIG. 1 shows a system that can be used to implement a data processing method provided by embodiments of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method implementations of the present disclosure may be performed in different orders and/or in parallel. Furthermore, the method implementations may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

For social networks or online office applications, it is necessary to organize the relationship of users (person users) according to a certain hierarchy, for example, to organize users into a group, in which the users, i.e., group members, may perform information interaction with each other. Moreover, it is also possible to organize different groups into a team or a part of the team, and users in the groups are also users in the team, that is, group members are also members of the team. An association relationship between the group and the team is changeable. A group may be added or deleted for a team having that group. When a data structure is used to implement the team and the group, and manage the relationship between them, data objects corresponding to the team may be directly associated with data objects corresponding to the group. This approach is simple and direct, but less scalable, not conducive to introduction of new data objects and expansion of new functions, and also has slow data processing speed and low data processing efficiency.

At least one embodiment of the present disclosure provides a data processing method, and the data processing method includes: creating a first management item for a first entity object and binding the first entity object to the first management item, where the first management item includes first change information of the first entity object; creating at least one second management item for at least one second entity object, respectively, and binding the at least one second entity object to the at least one second management item, respectively, where each of the at least one second management item includes second change information of a corresponding second entity object; establishing, based on a logical relationship between the first entity object and the at least one second entity object, a first hierarchical relationship between the first management item and the at least one second management item; and maintaining the first hierarchical relationship according to the logical relationship between the first entity object and the at least one second entity object.

In the data processing method according to the embodiments of the present disclosure, by binding the first entity object to the first management item independent of the first entity object, binding the second entity object to the second management item independent of the second entity object, and establishing the first hierarchical relationship between the first management item and the second management item, a change in the association relationship between the first entity object and the second entity object can be realized by modifying the first hierarchical relationship, thereby reducing the amount of computation required when a change is made to a logical relationship between different entity objects and improving the data processing speed and the data processing efficiency, while facilitating optimization of the data structure and improving flexibility of a high-level application.

Furthermore, in the data processing method according to the embodiments of the present disclosure, the first management item and the second management item store the first change information of the first entity object and the second change information of the second entity object, respectively. Thus, based on the first change information and the second change information recorded in the first management item and the second management item, respectively, the current version information corresponding to the first entity object and the second entity object may be accurately and efficiently obtained, thereby facilitating processing operations such as organizing, storing, invoking, updating, and the like of data of the first entity object and data of the second entity object stored on different terminals.

In the following, the embodiments of the present disclosure will be described in detail with reference to the accompanying drawings. It should be noted that the same reference signs in different figures will be used to refer to the same elements that have been described.

FIG. 1 shows a system that can be used to implement a data processing method provided by embodiments of the present disclosure. As illustrated in FIG. 1, a system 100 may include a user terminal 110, a network 120, a server 130, and a database 140. For example, the system 100 may be configured to implement a data processing method according to any one of the embodiments of the present disclosure.

The user terminal 110 is, for example, a computer 110-1 or a cell phone 110-2. It should be understood that the user terminal 110 may be any other type of electronic devices capable of executing data processing, which may include, but is not limited to, a desktop computer, a laptop computer, a tablet computer, a smartphone, a smart home device, a wearable device, an in-vehicle electronic device, a monitoring device, and the like. The user terminal 110 may also be any equipment provided with an electronic device, such as a vehicle, a robot, etc.

A user may operate through an application installed on the user terminal 110. The application transmits user behavior data to the server 130 through the network 120. The user terminal 110 may also receive data transmitted by the server 130 through the network 120.

The user terminal 110 may implement the data processing method provided by the embodiments of the present disclosure by running programs or threads, such as running a client. In some examples, the user terminal 110 may utilize its built-in application to perform the data processing method. In some other examples, the user terminal 110 may perform the data processing method by invoking applications stored externally to the user terminal 110.

The network 120 may be a single network, or a combination of at least two different networks. For example, the network 120 may include, but is not limited to, a combination of one or more of a local area network, a wide area network, a public network, a private network, and the like.

The server 130 may implement the data processing method according to the embodiments of the present disclosure by running programs or threads, which may be a single server, or a cluster of servers (e.g., cloud service), where the individual servers within the cluster of servers are connected via a wired or wireless network. The cluster of servers may be centralized, for example, a data center, or may be distributed. The server 130 may be local or remote. The server 130 may communicate with the user terminal 110 via a wired or wireless network. For example, a server end (e.g., also referred to as a server or a server side) of a social software or an online office software may run on the server 130 to centrally manage user data and be responsible for information transmission and the like. Moreover, in the case that users use a client of the social software or online office software through different user terminals 110, the server end on the server 130 may also be responsible for partially synchronizing or fully synchronizing the user data recorded by each of the clients on the different user terminals 110, so that the user data recorded by each of the clients of the different user terminals 110 can be exactly the same or the same for at least part of the time, thereby providing convenience for the users.

The database 140 may refer generically to a device having a storage function. The database 140 is primarily configured to store various data utilized, generated, and outputted by the user terminal 110 and the server 130 in operation. The database 140 may be local or remote. The database 140 may include various memories, such as a random access memory (RAM), a read only memory (ROM), and the like. The storage devices mentioned above are only examples, and the storage devices that can be used by the system 100 are not limited to the above.

The database 140 may be interconnected or in communication with the server 130 or a part of the server 130 via the network 120, or directly interconnected or in communication with the server 130, or via a combination of the above.

In some examples, the database 140 may be a standalone device. In some other examples, the database 140 may also be integrated in at least one of the user terminal 110 or the server 130. For example, the database 140 may be provided on the user terminal 110 or may be provided on the server 130. For another example, the database 140 may also be distributed, with a part provided on the user terminal 110 and another part provided on the server 130, for example, the database 140 may also be a database running on the cloud.

Figure 2A:
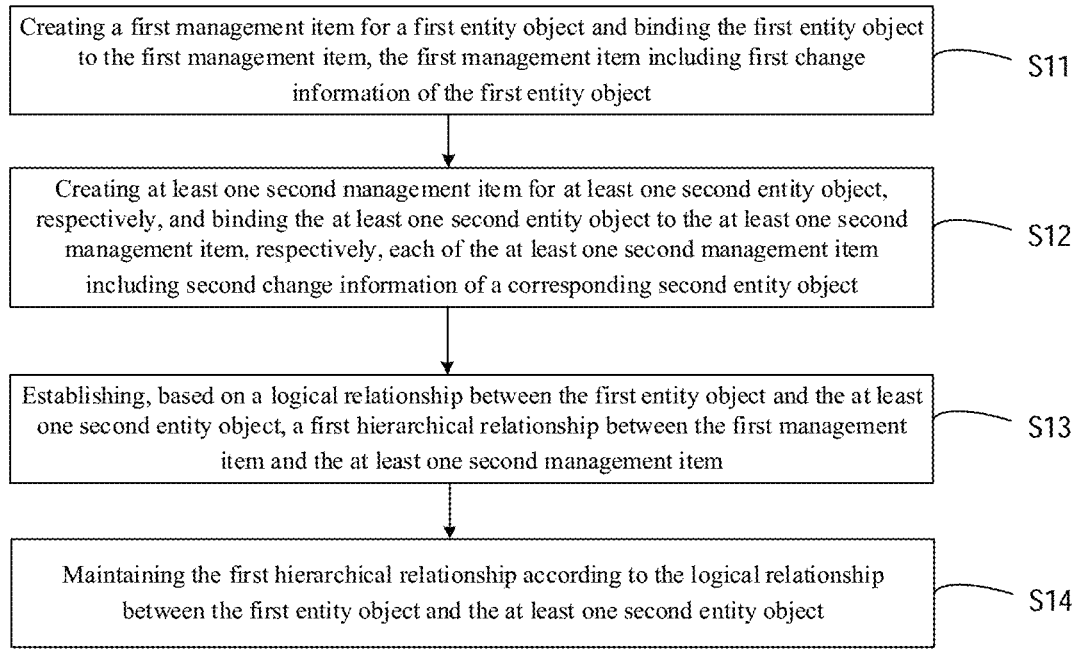
FIG. 2A is a schematic flowchart of a data processing method provided by some embodiments of the present disclosure.

FIG. 2A is a schematic flowchart of a data processing method provided by some embodiments of the present disclosure. For example, the data processing method may be applied to a server (e.g., a server end) or a client. For example, the server end (e.g., hereinafter referred to as a server) runs on the server 130 in the system 100 shown in FIG. 1, and the client runs on the user terminal 110, so that a user, e.g., a person user, can access the server via the user terminal 110 and perform operations through an operation interface provided by the client on the user terminal 110. The data processing method may be used, for example, in applications, such as the social application, online office, and the like. Since the server centrally manages user data and is responsible for information transmission and the like, an example of the data processing method applied to the server is illustrated as follows. When synchronization with the client is involved, the corresponding description for the client will be introduced.

As shown in FIG. 2A, the data processing method according to the embodiments of the present disclosure includes steps S11 to S14.

Step S11: creating a first management item for a first entity object and binding the first entity object to the first management item, the first management item including first change information of the first entity object.

Step S12: creating at least one second management item for at least one second entity object, respectively, and binding the at least one second entity object to the at least one second management item, respectively, each of the at least one second management item including second change information of a corresponding second entity object.

Step S13: establishing, based on a logical relationship between the first entity object and the at least one second entity object, a first hierarchical relationship between the first management item and the at least one second management item.

Step S14: maintaining the first hierarchical relationship according to the logical relationship between the first entity object and the at least one second entity object.

The first hierarchical relationship is maintained based on the logical relationship between the first entity object and the at least one second entity object, and thus, in some embodiments, the first entity object, the second entity object, and the logical relationship between the first entity object and the second entity object may be presented in a visualization manner on the client based on the first hierarchical relationship, which will be described in detail later.

Figure 3:
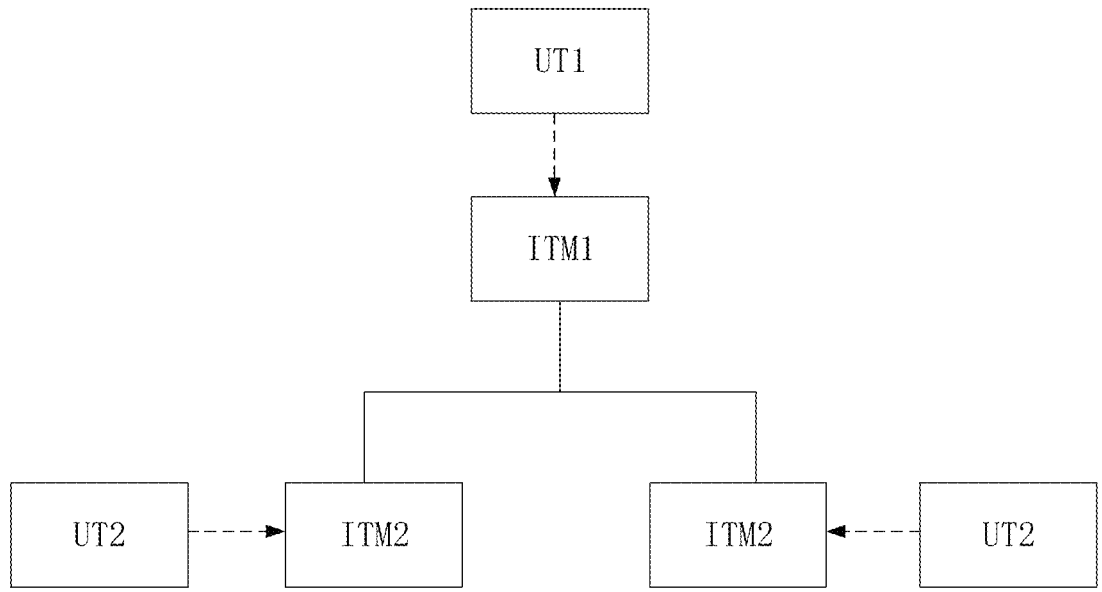
FIG. 3 is a schematic diagram of a data structure provided by some embodiments of the present disclosure.

FIG. 3 is a schematic diagram of a data structure provided by some embodiments of the present disclosure. For example, the data structure includes the first entity object, the second entity object, the first management item, the second management item, and the like in Steps S11 to S14 described above. Various steps of the data processing method shown in FIG. 2A are described below in conjunction with the data structure shown in FIG. 3.

For example, with reference to FIG. 2A and FIG. 3, a first entity object UT1 may be various appropriate types of entity objects, for example, it may be an object collection in the social software or the online office software, and it may also be other entity objects, such as documents, schedules, and the like; and a second entity object UT2 may be various appropriate types of entity objects, for example, it may be an object collection in the social software or the online office software, and it may also be other entity objects, such as documents, schedules, and the like.

For example, the object collection in the social software or online office software is a collection that includes multiple users, i.e., includes multiple users that are organized together for such as information exchange and data sharing with each other. A certain association relationship may be established between different object collections, for example, a second object collection may be subordinate to a first object collection. The second object collection being "subordinate" to the first object collection means that operation permissions that the second object collection can execute are restricted to operation permissions that the first object collection can execute. Alternatively, it may also mean that an information transmission boundary or transmission range of the second object collection is restricted to an information transmission boundary or transmission range of the first object collection. In the embodiments of the present application, the user may refer to a real person or entity that uses the relevant device or network service, that is, a real user; alternatively, the user may refer to a computer program, such as a chat robot or a service assistant, which is set up in a system and capable of simulating a human conversation for providing service.

For example, hereinafter, the first entity object UT1 is described by taking the "first object collection" as an example, and the second entity object UT2 is described by taking the "second object collection" as an example, where the second entity object UT2 is based on (or subordinate to) the first entity object UT1 in a logical relationship.

For example, in some examples, the "first object collection" may be represented or understood as a "team" that includes multiple users, etc., and the "second object collection" may be represented or understood as a "group" that includes multiple users, such as a chat group for instant messaging for multiple users to perform interaction in a group with information such as text, images, voice, video, and web links.

For example, in an exemplary application scenario of an online office software, the "first object collection," i.e., a "team," is created, which includes all employees of a company, and one or more "second object collections," i.e., "groups" are created to correspond to different types of subgroups in the company, for example, a "company chat group" created by the general manager's office, which includes all the employees of the company (e.g., corresponding to a default communication group of the company), for another example, a "human resource group" created by the human resource department that includes all the company employees, or for another example, a "marketing group" created by the marketing department that includes only members of the marketing department, a "technology group" created by the technology department that includes only members of the technology department, and the like. These groups are subordinate to the company which is as a team, and in these groups, the respective members can chat, share information, and the like. Thus, when an employee leaves the company, the employee will be removed from each group that the employee belongs to, or when a new employee joins the marketing department, the employee will be added to the "company chat group" and the "human resource group" which both contain all the employees of the company, and the employee will also be added to the "marketing group," but not to the "technology group" or the like. However, non-employees of the company cannot be added to the company "team" and also cannot be added to any one of the groups of the company. Therefore, the company "team" defines boundaries of the information interaction of the groups subordinate to the company, and may, for example, further define permission boundaries of the groups subordinate to the company.

In another exemplary application scenario of the online office software, a plurality of "first object collections," i.e., "teams," are created within the technology department, including a "product-1 team" that contains all the employees who develop the product 1, a "product-2 team" that contains all the employees who develop the product 2, and the like. For each team, it is also possible to create one or more subordinate "second object collections," i.e., "groups," corresponding to different tasks of product development. For example, for the "product-1 team," it is possible to create a "daily communication group" (e.g., corresponding to a default communication group of the team) that contains all the employees who develop the product 1, a "module-1 communication group" that contains employees who develop the module 1, a "module-2 communication group" that contains employees who develop the module 2, and the like. An employee of the technology department may belong to one or more teams in the corresponding online office software, and may belong to one or more groups within a specific team. In a user interface of the online office software used by the employee, the one or more teams and one or more groups under each team may be listed at the same time, and the corresponding information exchange and sharing may be carried out in these groups. As different employees may belong to different teams or different groups within a specific team, different employees will have different user interfaces when using the online office software.

Figure 2B:
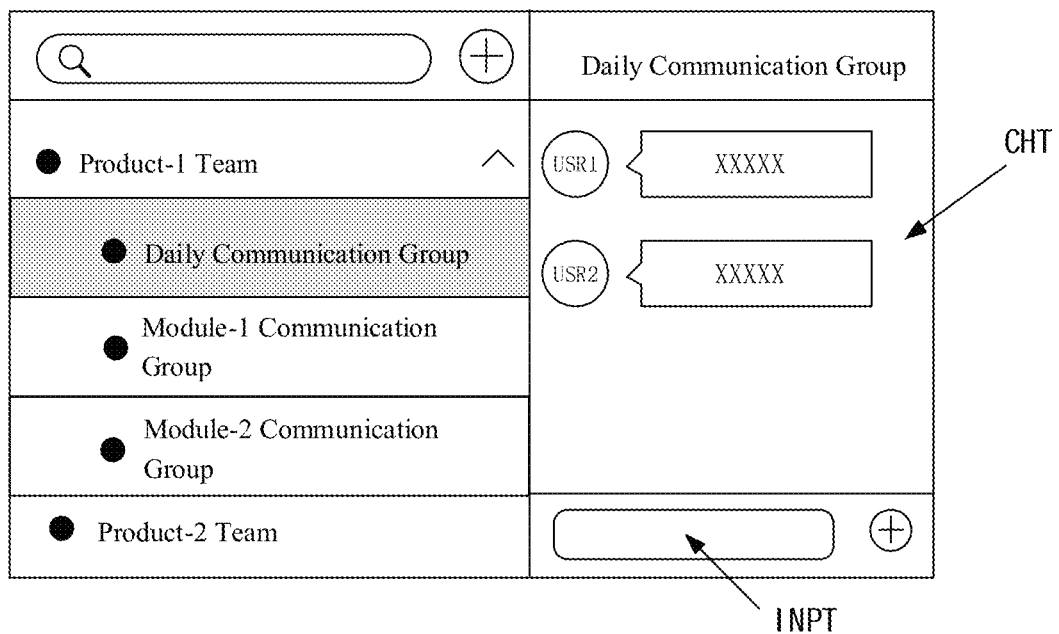
FIG. 2B is an exemplary schematic diagram of a client operation interface in some embodiments of the present disclosure.

FIG. 2B illustrates an example of a client operation interface according to at least one embodiment of the present disclosure, in which a "product-1 team" and a "product-2 team" are taken as an example. There is a "team" operation tab on the operation interface for operating the mode of team. The team to which the user belongs and groups in each team are shown on the left side of the interface. As shown in FIG. 2B, the user belongs to at least the "product-1 team" and "product-2 team," and the "product-1 team" has a "daily communication group," a "module-1 communication group," and a "module-2 communication group." At present, the "daily communication group" is selected (shown in gray), a chat window CHT corresponding to the "daily communication group" is shown on the right side of the interface, and historical messages are displayed on the upper side of the chat window CHT, for example, messages that have been sent by other users in the group, namely, USR1 and USR2. An input box INPT is shown on the lower side of the chat window for the user to input.

For example, each team has one or more team administrators, who are members of the team and have various permissions to manage the team, including adding or deleting team members, disbanding the team, creating one or more groups in the team. For example, the administrator may also have a permission to disband the group in the team, or may have a permission to set up for some team member. The status of team administrator is transferable, i.e., to other team members in the team. Team members can personalize the team they belong to, e.g., by sticking a team that they belong to on the top, setting a do-not-disturb function, and the like.

For example, each group may have one or more group administrators, who are members of the group and have various permissions to manage the group, but the permissions to manage the group may vary in different application scenarios or according to different requirements. For example, in the case that group members need to be the same as team members in the team to which they belong (e.g., in the case that the group members and the team members are bound), the group administrator does not have a permission to add or delete the group member. The status of group administrator is transferable, i.e., to other group members in the group. Group members may be set to have different permissions for the group they belong to, such as the permissions to listen to messages, send messages, send web links, initiate online meetings, and share schedules. In addition, each group member may make various personalized settings, such as sticking the group they belong to on the top (e.g., sticking a group within a team on the top), setting a do-not-disturb function, and the like.

For example, for the above Step S11, after creating the first management item ITM1 for the first entity object UT1, the first entity object UT1 is bound to the created first management item ITM1. For example, the first management item ITM1 points to the first entity object UT1, and various types of data interaction operations, such as data accessing and invoking, can be performed between the first management item ITM1 and the first entity object UT1. The first management item ITM1 includes the first change information of the first entity object UT1. For example, the first change information may include current version information (e.g., a version), historical version information, version changing information, and the like of the first entity object UT1, so that the first change information recorded in the first management item ITM1 may assist in the update of data of the first entity object UT1.

For example, for the above Step S12, after the second management item ITM2 is created for the second entity object UT2, the second entity object UT2 is bound to the created second management item ITM2. For example, the second management item ITM2 points to the second entity object UT2, and various types of data interaction operations, such as data accessing and invoking, can be performed between the second management item ITM2 and the second entity object UT2. The second management item ITM2 includes the second change information of the second entity object UT2. For example, the second change information may include current version information, historical version information, version changing information, and the like of the second entity object UT2, so that the second change information recorded in the second management item ITM2 may assist in the update of data of the second entity object UT2.

For example, for the above Step S13, by establishing the first hierarchical relationship between the first management item ITM1 and the second management item ITM2, a data structure including the first management item ITM1 and the second management item ITM2 as data elements respectively may be constituted. Moreover, since the first hierarchical relationship is established based on a logical relationship between the first entity object UT1 and the second entity object UT2, a hierarchical relationship or an association relationship between the first entity object UT1 and the second entity object UT2 may also be embodied by the first hierarchical relationship established.

For example, the first hierarchical relationship between the first management item ITM1 and the second management item ITM2 may be a subordinate relationship as shown in FIG. 3, that is, the second management item ITM2 is subordinate to the first management item ITM1, so that a tree structure shown in FIG. 3 with the first management item ITM1 and the second management item ITM2 as a parent node and a child node respectively is constituted. Alternatively, based on different logical relationships between the first entity object UT1 and the second entity object UT2, the first hierarchical relationship between the first management item ITM1 and the second management item ITM2 may be a parallel relationship, a linking relationship, or the like, so that the first management item ITM1 and the second management item ITM2 may form other types of data structures.

It should be noted that two second entity objects UT2 and two second management items ITM2 created for these two second entity objects UT2 are illustrated in FIG. 3, and both of the two second management items ITM2 are subordinate to the first management item ITM1. In some other embodiments of the present disclosure, the number of the second entity objects UT2 and the corresponding second management items ITM2 may be one, three, four, or more, and a hierarchical relationship between each of the plurality of second management items ITM2 and the first management item ITM1 may be the same as, or different from each other, and the embodiments of the present disclosure do not impose any specific limitations thereto.

For example, for the above Step S14, after establishing a data structure with the first management item ITM1 and the second management item ITM2 as data elements respectively, the first hierarchical relationship may be modified according to a change in the logical relationship between the first entity object UT1 and the second entity object UT2, so that the first hierarchical relationship between the first management item ITM1 and the second management item ITM2 is consistent with the logical relationship between the first entity object UT1 and the second entity object UT2.

In the data processing method according to at least one embodiment of the present disclosure, instead of directly establishing the hierarchical relationship or association relationship between the first entity object UT1 and the second entity object UT2, the first hierarchical relationship is established between the first management item ITM1 bound to the first entity object UT1 and the second management item ITM2 bound to the second entity object UT2, so that an association between the first entity object UT1 and the second entity object UT2 is established and managed through the first hierarchical relationship.

For example, in the case that the second entity object UT2 is subordinate to the first entity object UT1, when the logical relationship between the first entity object UT1 and the second entity object UT2 is changed, for example, when the second entity object UT2 is no longer subordinate to the first entity object UT1, data used for realizing the abovementioned hierarchical relationship needs to be stored in the first entity object UT1 and/or the second entity object UT2 for the case where the hierarchical relationship between the first entity object UT1 and the second entity object UT2 is directly established. Thus, it is necessary to access and modify the data of the first entity object UT1 and/or the second entity object UT2 to change the hierarchical relationship between the first entity object UT1 and the second entity object UT2. When the overall data volume of the first entity object UT1 and the second entity object UT2 is large, the accessing and updating operation described above may generate a large amount of data computation, resulting in a serious reduction in the data processing speed and the data processing efficiency. However, for the data processing method according to the embodiments of the present disclosure, when the logical relationship between the first entity object UT1 and the second entity object UT2 is changed, the change in the hierarchical relationship or the association relationship between the first entity object UT1 and the second entity object UT2 may be realized by modifying the first hierarchical relationship between the first management item ITM1 and the second management item ITM2, without having to accessing or modifying the data of the first entity object UT1 and/or the second entity object UT2, thereby reducing the required amount of computation and improving the data processing speed and data processing efficiency.

Moreover, in the data processing method according to the above embodiments of the present disclosure, since the first management item ITM1 and the second management item ITM2 store the first change information of the first entity object UT1 and the second change information of the second entity object UT2, respectively, it is possible to accurately and efficiently acquire, for example, version change information corresponding to the first entity object UT1 and the second entity object UT2 based on the first change information and the second change information recorded in the first management item ITM1 and the second management item ITM2, respectively, thereby reducing the amount of computation required for updating the first entity object UT1 and the second entity object UT2.

For example, the first entity object UT1 and the first management item ITM1 are stored separately from each other, that is, the first management item ITM1 is stored independently of the first entity object UT1, and the first entity object UT1 and the first management item ITM1 are with different storage addresses; and the second entity object UT2 and the second management item ITM2 are stored separately from each other, that is, the second management item ITM2 is stored independently of the second entity object UT2, and the second entity object UT2 and the second management item ITM2 are with different storage addresses.

For example, when the first entity object corresponds to a "team," the first entity object is stored and processed by the same team service module (which provides team management services, e.g., it may also be referred to as a team server) as other entity objects corresponding to the "team." When the second entity object corresponds to a "group," the second entity object may be stored and processed by the same group service module (which provides group management services, e.g., it may also be referred to as a group server) as other entity objects corresponding to the "group." The first management item and the second management item may be stored and processed along with other management items by a management item service module (which provides management item services, e.g., it may also be referred to as a management item server). In these embodiments, on the server of the system, the team service module, the group service module, and the management item service module may run in different device hardware, or in the same hardware device. The server may also include a message gateway (e.g., an im-gateway). The message gateway is used to receive messages from the client or to dispatch server messages from the server to the client, so as to realize data exchange and synchronization between the server and the client. For example, the server messages include update information, feedback of the user's operation instructions, and the like. Similarly, the client may also include a message gateway. The message gateway is used to receive messages from the server or to send client messages from the client to the server. The client messages include operation instructions entered by the user through the operation interface on the client. The operation instructions include entered information, sent image information, creating a group, setting user attributes, and the like.

For example, an SDK (software development kit) may be provided on the server and/or the client to implement the corresponding data processing method.

For example, during establishing or modifying the first hierarchical relationship between the first management item ITM1 and the second management item ITM2, the data of the first management item ITM1 and the data of the second management item ITM2 need to be modified. By the way of storing the first entity object UT1 and the first management item ITM1 separately from each other and storing the second entity object UT2 and the second management item ITM2 separately from each other as described above, when the logical relationship between the first entity object UT1 and the second entity object UT2 is changed, it is only necessary to access, invoke, or modify corresponding data of the first management item ITM1 and the second management item ITM2, thereby reducing the required amount of computation and improving the data processing speed and the data processing efficiency.

For example, the embodiments of the present disclosure do not impose specific limitations to the data types, storage structures, stored data contents, and the like of the first entity object UT1, the second entity object UT2, the first management item ITM1, and the second management item ITM2. For example, each of the first management item ITM1 and the second management item ITM2 may have these attributes: a self-identification number (id), a bound entity object ID (entity_id), a bound entity object type (entity_type), a parent node identification number (parent_id), a status (status or is_deleted), and the like. When a management item is deleted, or an entity object corresponding to the management item is deleted or disbanded, a status value of the management item is changed, for example, to 0 for valid and 1 for deleted. For example, the first entity object UT1 corresponds to a team, which may have these attributes: a team self-identification number (team_id), and other team-related attributes; and the second entity object UT2 corresponds to a group, which may have these attributes: a group self-identification number (chat_id), and other group-related attributes.

For another example, taking the example of applying the data processing method according to the embodiments of the present disclosure to a social application, each of the first entity object UT1 and the second entity object UT2 may correspond to a group that contains multiple user members in the social application. For example, the first entity object UT1 may be a first user group including multiple user members, and the second entity object UT2 may be a second user group including multiple user members. For example, in the case that the second entity object UT2 is subordinate to the first entity object UT1, the second user group is a subset of the first user group, that is, all of the user members of the second user group are included in the user members of the first user group.

For example, the type of the first entity object UT1 may be different from the type of the second entity object UT2. Thus, by establishing and maintaining the first hierarchical relationship between the first management item ITM1 and the second management item ITM2, the establishment and maintenance of the association relationship or hierarchical relationship between different types of entity objects can be optimized, the amount of computation required for accessing, invoking, or modifying data of the different types of entity objects can be reduced, and the data processing speed and the data processing efficiency can be improved.

For example, in some embodiments of the present disclosure, as shown in FIG. 3, the second entity object UT2 is subordinate to the first entity object UT1. Accordingly, in the first hierarchical relationship, the first management item ITM1 serves as a parent node, and the second management item ITM2 serves as a child node of that parent node. In this example, after the first entity object UT1 is bound to the first management item ITM1, the entity id of the first management item ITM1 is modified to the team_id of the first entity object UT1, and the entity_type of the first management item ITM1 is modified to the type of the first entity object UT1, i.e., a team. After the second entity object UT2 is bound to the second management item ITM2, the entity id of the second management item ITM2 is modified to the chat_id of the second entity object UT2, and the entity_type of the second management item ITM2 is modified to the type of the second entity object UT2, i.e., a group. Furthermore, when the second management item ITM2 is set to be subordinate to the first management item ITM1, the parent_id of the second management item ITM2 is modified to the id of the first management item ITM1.

Hereinafter, in some embodiments of the present disclosure, various steps of the data processing method according to the embodiments of the present disclosure are specifically described by taking the tree structure composed of the first management item ITM1 and the second management item ITM2 shown in FIG. 3 as an example.

For example, in response to a change in the first entity object, the data processing method according to the embodiments of the present disclosure further includes Step S21 as below.

Step S21: updating the first change information of the first management item.

Thus, when the first entity object is changed, the current version information, the historical version information, or the version change information, and the like of the first entity object may be recorded in the first management item by updating the first change information, which facilitates a subsequent update of the first entity object based on the first change information.

For example, in response to a change in the second entity object, the data processing method according to the embodiments of the present disclosure further includes Step S22 as below.

Step S22: updating the second change information of the second management item.

Thus, when the second entity object is changed, the current version information, the historical version information, the version change information, and the like of the second entity object may be recorded in the second management item by updating the second change information, which facilitates a subsequent update of the second entity object based on the second change information.

For example, the first change information includes a first serial number for recording the version change information of the first entity object, and the second change information includes a second serial number for recording the version change information of the second entity object. For example, the first serial number and the second serial number may be a number or a set of numbers such as a version number, a change operation number, or a number of times of change for reflecting the change information of the corresponding entity object. For example, the first serial number and the second serial number may include numbers, letters, identifiers, etc.

For example, the above Step S21 may include: performing an increment operation on the first serial number to update the first serial number. For example, when the first entity object is changed, an increment operation is performed on the first serial number, such as adding one to the first serial number, so that the updating efficiency of the first change information can be improved, and the data processing speed and the data processing efficiency can be improved.

For example, the above Step S22 may include Steps S221 and S222 as below.

Step S221: determining a target second management item to be updated currently.

Step S222: performing an increment operation on the second serial number of the target second management item to update the second serial number of the target second management item.

For example, for the above Steps S221 and S222, taking the case shown in FIG. 3 as an example, when there is a first hierarchical relationship between the first management item and each of the plurality of second management items, it is necessary to determine the currently updated second management item as the target second management item among the plurality of second management items. For example, when there is a first hierarchical relationship between the first management item and only one second management item, then in response to the update of the one second management item, the one second management item is determined to be the target second management item. Thus, when the second entity object is changed, the efficiency of updating the second change information of the target second management item can be improved by performing an increment operation on the second serial number of the corresponding target second management item, such as adding one to the second serial number, thereby improving the data processing speed and the data processing efficiency.

For example, when there is a first hierarchical relationship between the first management item and each of the plurality of second management items (when there is a first hierarchical relationship with the plurality of second management items, the first hierarchical relationship may be one hierarchical relationship or a plurality of hierarchical relationships, such as a plurality of hierarchical relationships having a recursive hierarchy), second serial numbers of the plurality of second management items are different from each other and cannot be used repeatedly. For example, before or after the second serial number of the target second management item is updated, the second serial number of the target second management item is different from the second serial number of any other second management item. For example, when an increment operation is performed on the second serial number of the target second management item in accordance with a predetermined incremental value, if the second serial number of the target second management item after the increment operation is the same as the second serial number of any other second management item, then the increment operation continues to be performed on the second serial number of the target second management item, until the second serial number of the target second management item is different from the second serial number of any other second management item.

Figure 4:
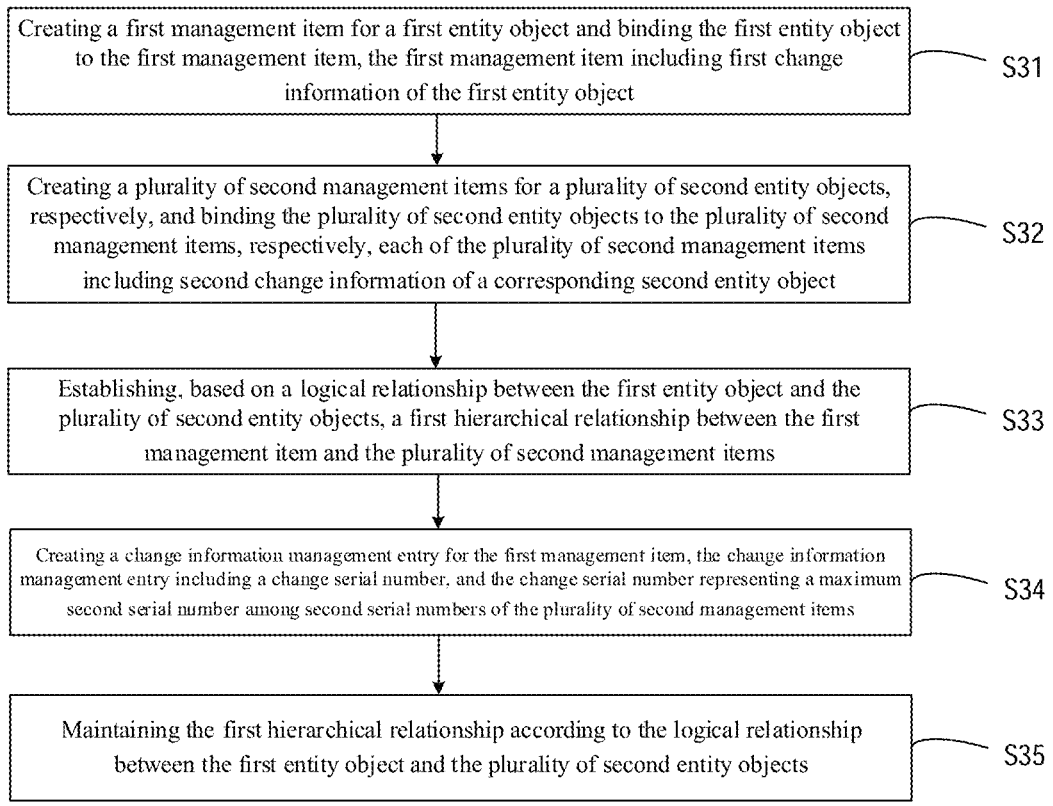
FIG. 4 is another schematic flowchart of a data processing method provided by some embodiments of the present disclosure.
Figure 5:
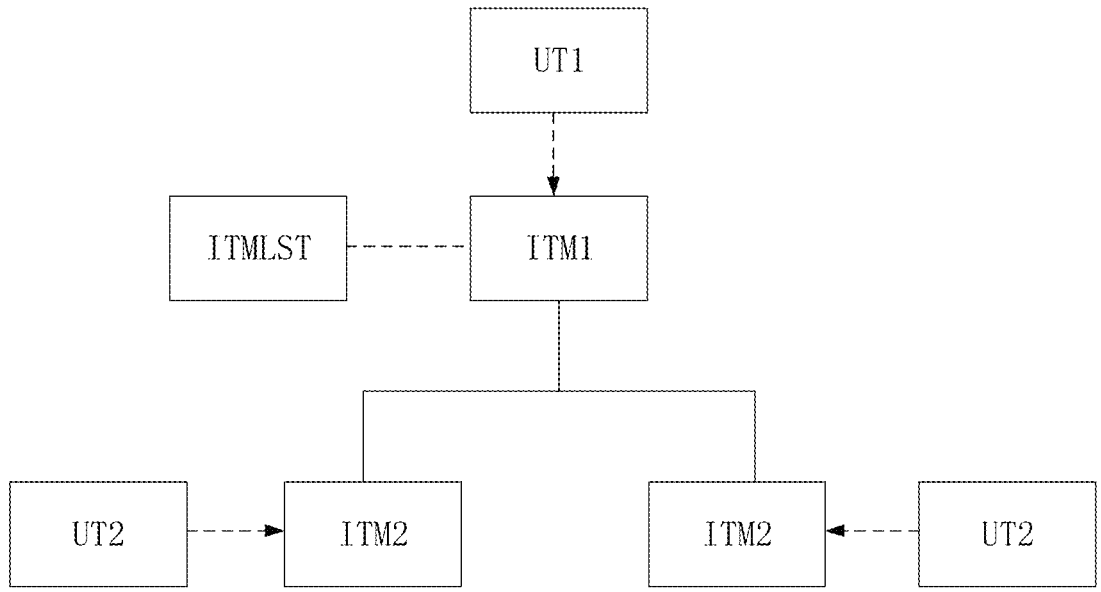
FIG. 5 is another schematic diagram of a data structure provided by some embodiments of the present disclosure.

FIG. 4 is another schematic flowchart of a data processing method provided by some embodiments of the present disclosure. It should be noted that, except for Step S34, Steps S31 to S33 and Step S35 are respectively substantially the same as or similar to Steps S11 to S14 of the data processing method shown in FIG. 2A. Specific descriptions of Steps S31 to S33 and Step S35 may be respectively referred to the relevant descriptions corresponding to Steps S11 to S14 shown in FIG. 2A in the embodiments of the data processing method described above, and repetitions will be omitted. FIG. 5 is another schematic diagram of a data structure provided by some embodiments of the present disclosure. It should be noted that the data structure shown in FIG. 5 is substantially the same as or similar to the data structure shown in FIG. 3, except for a change information management entry ITMLST, and repetition will be omitted.

As shown in FIG. 4, the data processing method includes Steps S31 to S35 as below.

Step S31: creating a first management item for a first entity object and binding the first entity object to the first management item, the first management item including first change information of the first entity object.

Step S32: creating a plurality of second management items for a plurality of second entity objects, respectively, and binding the plurality of second entity objects to the plurality of second management items, respectively, each of the plurality of second management items including second change information of a corresponding second entity object.

Step S33: establishing, based on a logical relationship between the first entity object and the plurality of second entity objects, a first hierarchical relationship between the first management item and the plurality of second management items.

Step S34: creating a change information management entry for the first management item, the change information management entry including a change serial number, and the change serial number representing a maximum second serial number among second serial numbers of the plurality of second management items.

Step S35: maintaining the first hierarchical relationship according to the logical relationship between the first entity object and the plurality of second entity objects.

For example, for Step S34, with reference to FIG. 5, after establishing the first hierarchical relationship between the first management item ITM1 and the plurality of second management items ITM2, the change information management entry ITMLST may be created for the first management item ITM1 to record the maximum second serial number among the second serial numbers of the plurality of second management items ITM2. Thus, during the update of the second serial number, the specific operation process for performing the increment operation on the second serial number of the target second management item may be optimized based on the change serial number in the change information management entry ITMLST.

For example, the change information management entry corresponding to each management item may also be stored and managed separately. In this case, in order to correspond to the corresponding entity object, the change information management entry may include these attributes: a corresponding management item ID (item_id), a version of management item itself (e.g., a version), a maximum version (Max_version) of management item child node, and the like. Here, when a management item corresponding to the change information management entry does not have a child node, the maximum version (Max_version) of management item child node may be absent or set to a default value (e.g., 0). For example, the first serial number of the first management item and the second serial number of the second management item described above correspond to the attribute of the version of management item itself described above, such as a natural number (e.g., of type int64).

Figure 6:
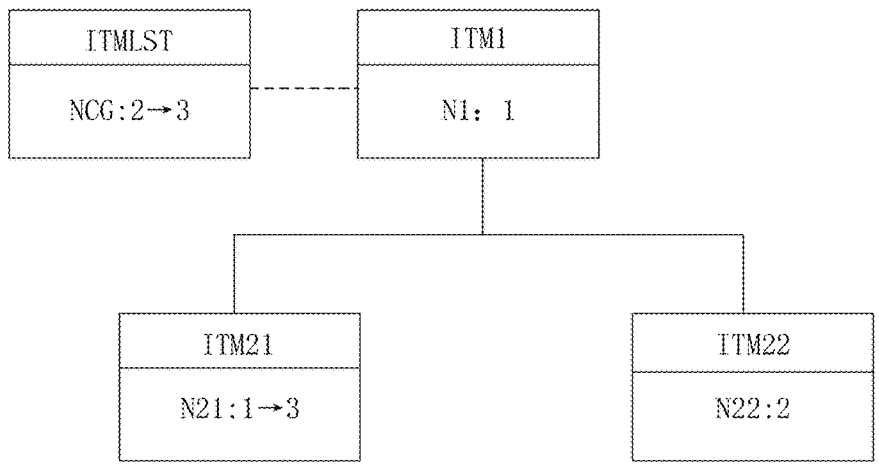
FIG. 6 is a schematic diagram of updating a second serial number of a target second management item provided by some embodiments of the present disclosure.

FIG. 6 is a schematic diagram of updating a second serial number of a target second management item provided by some embodiments of the present disclosure.

For example, as shown in FIG. 6, the first management item ITM1 includes a first serial number N1, two second management items ITM21 and ITM22 respectively include second serial numbers N21 and N22 that are different from each other, and the change information management entry ITMLST includes a change serial number NCG. For example, the change serial number NCG of the change information management entry ITMLST corresponds to the maximum version (Max_version) of management item child node, such as a natural number (e.g., of type int64).

For example, in conjunction with FIG. 6, in the case that the second management item ITM21 serves as the target second management item, the increment operation on the second serial number of the target second management item in the above Step S222 may include Step S2221 as below.

Step S2221: obtaining the change serial number NCG, and updating the second serial number N21 of the target second management item ITM21 to a sum of the change serial number NCG and a predetermined increment.

For example, as shown in FIG. 6, before executing Step S2221, the second serial numbers N21 and N22 of the second management items ITM21 and ITM22 are 1 and 2, respectively, and the change serial number NCG of the change information management entry ITMLST is the maximum second serial number of 1 and 2, i.e., 2. For example, taking the predetermined increment being 1 as an example, when updating the second serial number N21 of the target second management item ITM21, the second serial number N21 is updated to the sum of the change serial number NCG and the predetermined increment, that is, the second serial number N21 is updated to 2+1=3.

For example, with reference to FIG. 6, after performing the above Step S2221, the increment operation on the second serial number of the target second management item in the above Step S222 further includes step S2222 as below.

Step S2222: updating the change serial number NCG to the second serial number N21 of the target second management item ITM21 after updating the second serial number N21 of the target second management item ITM21.

For example, as shown in FIG. 6, after updating the second serial number N21 of the target second management item ITM21 to 3, the change serial number NCG is also updated to 3, so that the change serial number NCG may be consistent with the maximum second serial number between the second serial numbers N21 and N22 of the second management items ITM21 and ITM22.

For example, in the example shown in FIG. 6, the first serial number N1 of the first management item ITM1 is 1. For example, in the process of updating the second serial number N21 of the target second management item ITM21 as described above, the first serial number N1 of the first management item ITM1 does not need to change accordingly. For example, there is no direct relationship between the first serial number N1 of the first management item ITM1 and the second serial number N21 of the second management item ITM21 or the second serial number N22 of the second management item ITM22. Thus, the first serial number N1 of the first management item ITM1 does not need to respond to the update of the second serial number N21 or N22, and the same numbering as the second serial number N21 or N22 may be used in the process of numbering the first serial number N1 of the first management item ITM1.

For example, in some embodiments of the present disclosure, the above data processing method may be applied on the server and the client, respectively. For a particular user, the server records and maintains the full amount of data of the first entity object, the second entity object, the first management item, the second management item, and the like for the user. A specific client of the user records and maintains copies of the first entity object, the second entity object, the first management item, the second management item, and the like for the user. Data transmission between the server and the client is realized through a network, so as to realize synchronous update of the data stored on the server and the client with respect to the first entity object, the second entity object, the first management item, the second management item, and the like. Thus, even if the user uses the corresponding software by different clients, the user can obtain all of the historical information or choose part of the historical information.

Figure 7:
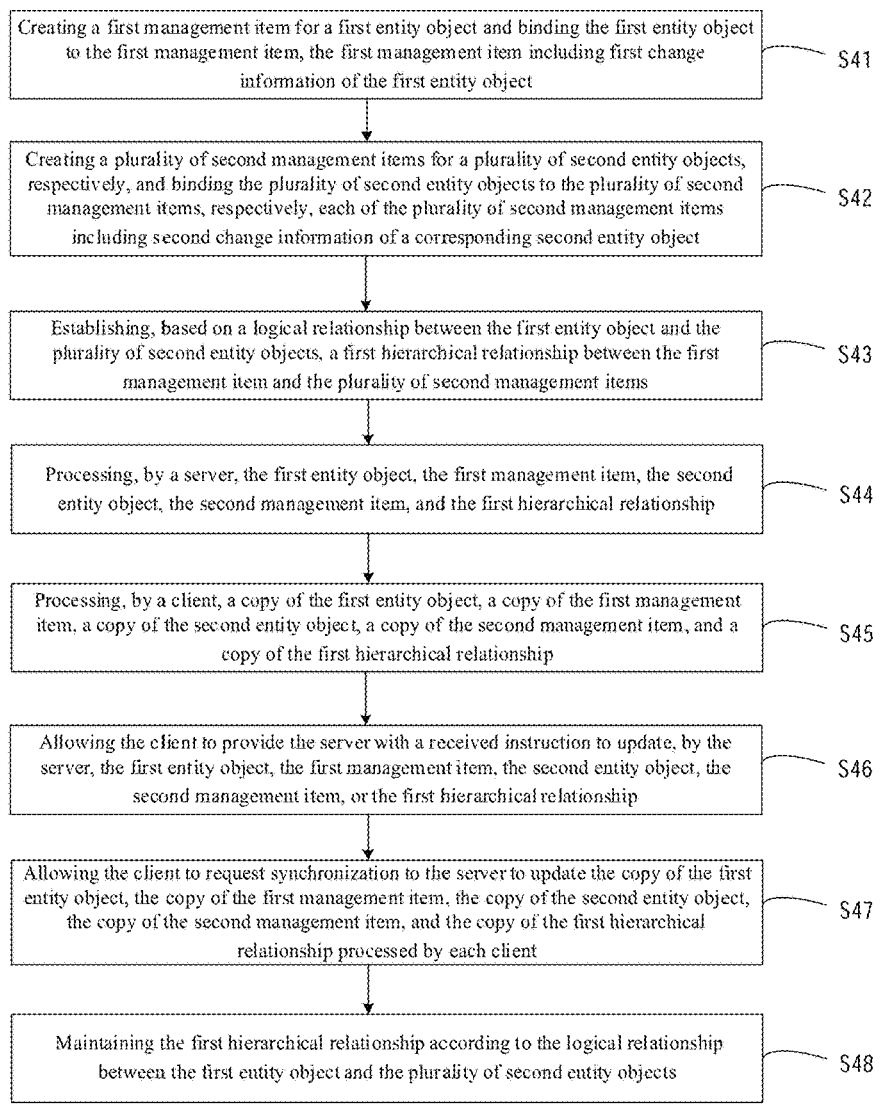
FIG. 7 is further still another schematic flowchart of a data processing method provided by some embodiments of the present disclosure.

FIG. 7 is further still another schematic flowchart of a data processing method provided by some embodiments of the present disclosure. It should be noted that, except for Steps S44 to S47, Steps S41 to S43 and Step S48 are respectively substantially the same as or similar to Steps S11 to S14 of the data processing method shown in FIG. 2A. Specific descriptions of Steps S41 to S43 and Step S48 may be respectively referred to the relevant descriptions corresponding to Steps S11 to S14 shown in FIG. 2A in the embodiments of the data processing method described above, and repetitions will be omitted.

As shown in FIG. 7, the data processing method includes Steps S41 to S48 as below.

Step S41: creating a first management item for a first entity object and binding the first entity object to the first management item, the first management item including first change information of the first entity object.

Step S42: creating a plurality of second management items for a plurality of second entity objects, respectively, and binding the plurality of second entity objects to the plurality of second management items, respectively, each of the plurality of second management items including second change information of a corresponding second entity object.

Step S43: establishing, based on a logical relationship between the first entity object and the plurality of second entity objects, a first hierarchical relationship between the first management item and the plurality of second management items.

Step S44: processing, by a server, the first entity object, the first management item, the second entity object, the second management item, and the first hierarchical relationship.

Step S45: processing, by a client, a copy of the first entity object, a copy of the first management item, a copy of the second entity object, a copy of the second management item, and a copy of the first hierarchical relationship.

Step S46: allowing the client to provide the server with a received instruction to update, by the server, the first entity object, the first management item, the second entity object, the second management item, or the first hierarchical relationship.

Step S47: allowing the client to request synchronization to the server to update the copy of the first entity object, the copy of the first management item, the copy of the second entity object, the copy of the second management item, and the copy of the first hierarchical relationship processed by each client.

Step S48: maintaining the first hierarchical relationship according to the logical relationship between the first entity object and the plurality of second entity objects.

For example, for the above Steps S44 to S47, the first entity object, the first management item, the second entity object, the second management item, and the first hierarchical relationship are stored on the server, that is, first data about the first entity object, the first management item, the second entity object, the second management item, and the first hierarchical relationship is stored on the server; and the copy of the first entity object, the copy of the first management item, the copy of the second entity object, the copy of the second management item, and the copy of the first hierarchical relationship are stored on the client, that is, second data about the first entity object, the first management item, the second entity object, the second management item, and the first hierarchical relationship is stored on the client. For example, when the client receives an update instruction, the client updates the stored second data and provides the received update instruction to the server, to enable the server to perform a synchronous update on the stored first data, so that the first data on the server is consistent with the second data on the client.

For example, when data synchronization is performed between the server and a plurality of clients through a network, after the server performs a synchronous update on the first data based on the received update instruction provided by one of the clients, when the other clients request synchronization to the server, the other clients perform synchronous update on the stored second data based on the updated first data on the server, so that the first data on the server is consistent with the second data on the different clients.

For example, the client may perform the above operations by running programs or threads, or may also perform the above operations by utilizing its built-in application or invoking an application stored externally to the client, and the embodiments of the present disclosure do not impose any specific limitations thereto.

For example, the above Steps S44 to S47 may also be performed after Step S48, so that synchronization may be maintained between the first data on the server and the second data on the client.

Figure 8:
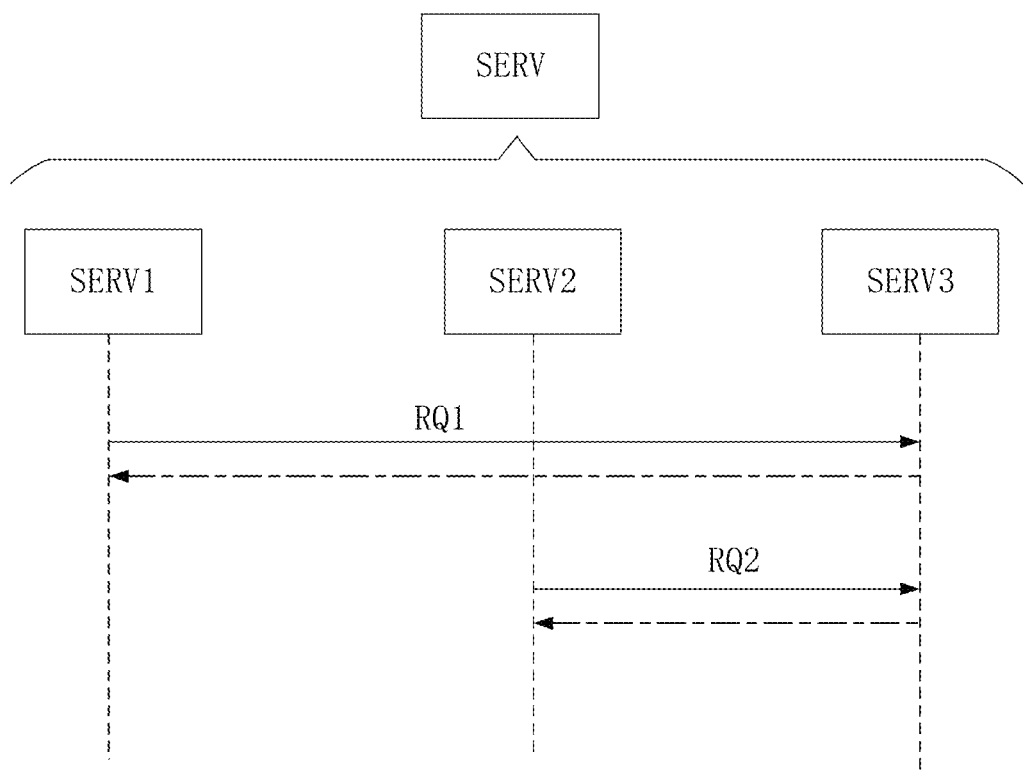
FIG. 8 is a schematic flowchart of a specific example of a data processing method provided by some embodiments of the present disclosure.

FIG. 8 is a schematic flowchart of a specific example of a data processing method provided by some embodiments of the present disclosure.

For example, as shown in FIG. 8, a server SERV includes a first entity object service module SERV1, a second entity object service module SERV2, and a management item service module SERV3. The first entity object service module SERV1 sends a first creation request RQ1 to the management item service module SERV3, and the management item service module SERV3 creates a first management item for the first entity object in response to the first creation request RQ1 and binds the first entity object to the first management item, e.g., performs Step S11 as shown above in FIG. 2A. The second entity object service module SERV2 sends a second creation request RQ2 to the management item service module SERV3, and the management item service module SERV3 creates a second management item for the second entity object in response to the second creation request RQ2 and binds the second entity object to the second management item, e.g., performs Step S12 as shown above in FIG. 2A. The management item service module SERV3 establishes and maintains a first hierarchical relationship based on a logical relationship between the first entity object and the second entity object, e.g., performs Steps S13 and S14 as shown above in FIG. 2A.

Furthermore, in at least one embodiment, local data management and maintenance of the client may be realized on the client by means of the first entity object service module SERV1, the second entity object service module SERV2, and the management item service module SERV3 corresponding to the server.

For example, in some embodiments of the present disclosure, upon synchronization of the client with the server, in response to the first management item being a parent node of the second management item in the first hierarchical relationship, the first management item is first synchronized with the copy of the first management item, and then the second management item is synchronized with the copy of the second management item. That is, when the first hierarchical relationship between the first management item and the second management item refers to that, for example, in the case that the second management item is subordinate to the first management item as shown in FIG. 3, the first management item stored on the server and the copy of the first management item stored on the client are subjected to data synchronization first, and then the second management item stored on the server and the copy of the second management item stored on the client are subjected to data synchronization. For example, when data of the parent node is updated, the data of all child nodes of the parent node need to be updated accordingly. Therefore, by synchronizing the child nodes after synchronizing the parent node first, the operation process of data processing can be optimized and the data processing efficiency can be improved.

For example, for a plurality of child nodes of a parent node, the synchronization order of the plurality of child nodes may be determined based on the data of the plurality of second entity objects corresponding to the plurality of child nodes. For example, in the case that the first entity object bound to the first management item is the team as described above, a default communication group of the team is a second entity object, the child nodes corresponding to the second entity object (i.e., the default communication group) may be synchronized preferentially.

For example, in some embodiments of the present disclosure, the data processing method further includes Step S51 as below.

Step S51: performing synchronization on the client based on the change information management entry.

For example, the example shown in FIG. 6 is illustrated as an example, upon the synchronization of the client with the server, after the copy of the first management item ITM1 and the first management item ITM1 are synchronized based on the first serial number N1 of the copy of the first management item ITM1 stored on the client and the first serial number N1 of the first management item ITM1 stored on the server, if the change serial number NCG in the copy of the change information management entry ITMLST stored on the client is the same as the change serial number NCG in the change information management entry ITMLST stored on the server, there is no need to update the copy of the second management item ITM2 stored on the client and the second management item ITM2 stored on the server; and if the change serial number NCG in the copy of the change information management entry ITMLST stored on the client is different from the change serial number NCG in the change information management entry ITMLST stored on the server, it is necessary to determine a copy of the second management item ITM2 on the client that needs to be updated based on the change serial number NCG in the change information management entry ITMLST stored on the server and the second change serial number of the copy of each second management item ITM2 stored on the client, so as to keep the second data stored on the client consistent with the first data stored on the server.

For example, if the change serial number NCG in the change information management entry ITMLST stored on the server is 4, and the change serial number NCG in the copy of the change information management entry ITMLST stored on the client is 3, then it only needs to locate the second management item ITM2 with the second change serial number of 4 on the server, and perform a synchronous update on the copy of the corresponding second management item ITM2 on the client, without having to perform a synchronous update on copies of the other second management items ITM2 on the client, thereby optimizing the operation process of data processing and improving the data processing efficiency. Further, after the copy of the corresponding second management item ITM2 is updated, the second change serial number of the copy of the corresponding second management item ITM2 is changed to 4, and accordingly, the change serial number NCG in the copy of the change information management entry ITMLST stored on the client is changed to 4, which is the same as the change serial number NCG in the change information management entry ITMLST stored on the server.

Figure 9:
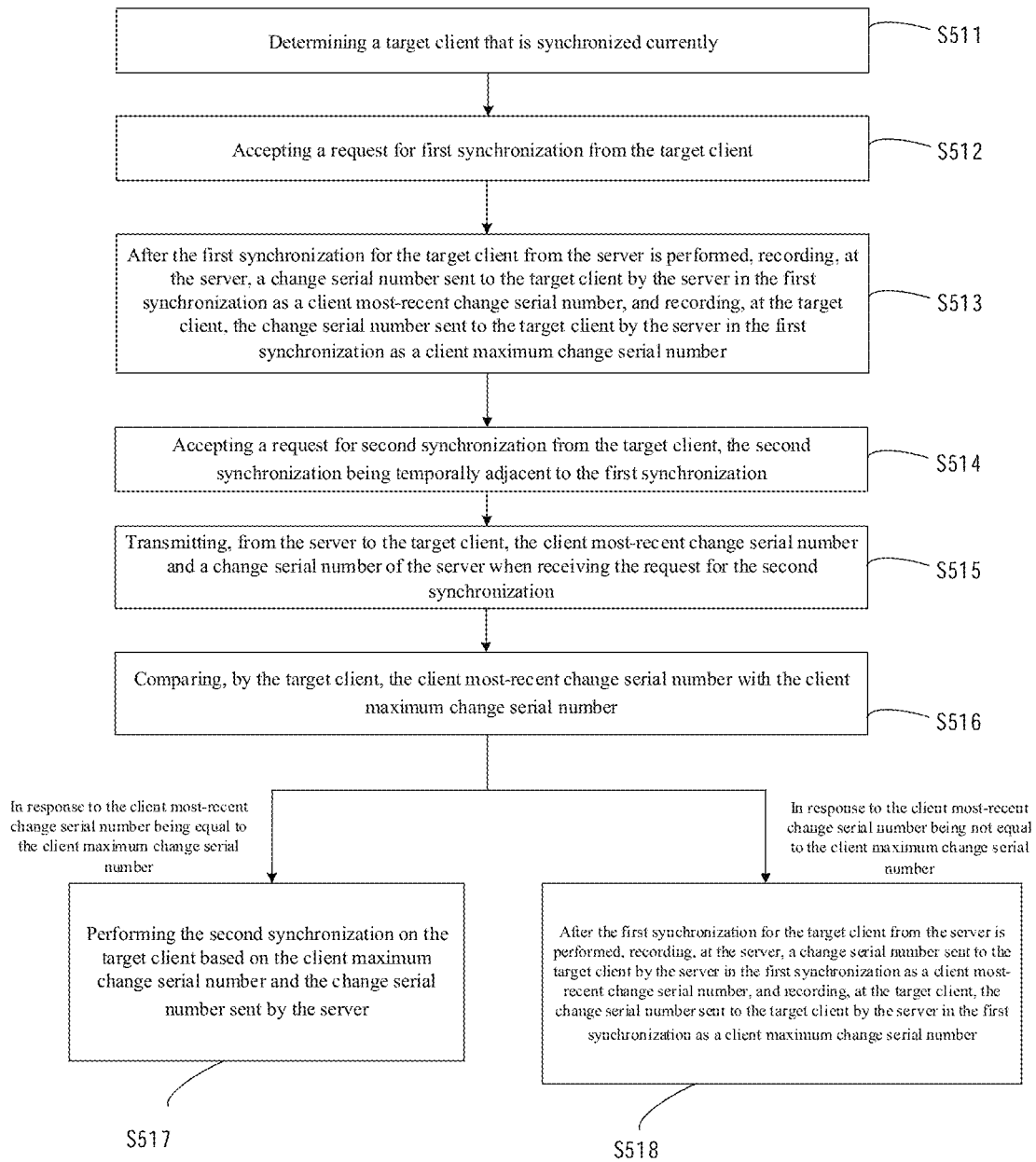
FIG. 9 is a schematic flowchart of Step S51 of a data processing method provided by some embodiments of the present disclosure.

FIG. 9 is a schematic flowchart of Step S51 of a data processing method provided by some embodiments of the present disclosure.

For example, as shown in FIG. 9, Step S51 includes Steps S511 to S513 as below.

Step S511: determining a target client that is synchronized currently.

Step S512: accepting a request for first synchronization from the target client.

Step S513: after the first synchronization for the target client from the server is performed, recording, at the server, a change serial number sent to the target client by the server in the first synchronization as a client most-recent change serial number, and recording, at the target client, the change serial number sent to the target client by the server in the first synchronization as a client maximum change serial number.

For example, when data synchronization is performed between the server and a plurality of clients through the network, it is necessary to determine a client that is synchronized currently as a target client among the plurality of clients. For example, when the server needs to maintain data synchronization with only one client, the one client is determined to be the target client in response to a request for first synchronization from the one client.

For example, after the server accepts the request for the first synchronization from the target client, the target client performs the first synchronization based on the change information management entry currently stored on the server. Moreover, after the first synchronization, the server records the change serial number sent to the target client in the first synchronization as a client most-recent change serial number MAXCLT, and the target client records the change serial number sent by the server in the first synchronization as a client maximum change serial number MAX.

For example, as shown in FIG. 9, in some embodiments of the present disclosure, the above Step S51 further includes Steps S514 to S518 as below.

Step S514: accepting a request for second synchronization from the target client, the second synchronization being temporally adjacent to the first synchronization.

Step S515: transmitting, from the server to the target client, the client most-recent change serial number and a change serial number of the server when receiving the request for the second synchronization.

Step S516: comparing, by the target client, the client most-recent change serial number with the client maximum change serial number.

In response to the client most-recent change serial number being equal to the client maximum change serial number:

Step S517: performing the second synchronization on the target client based on the client maximum change serial number and the change serial number sent by the server.

In response to the client most-recent change serial number being not equal to the client maximum change serial number:

Step S518: performing the second synchronization on the target client without limitation to the client maximum change serial number.

For example, the second synchronization is temporally adjacent to the first synchronization, that is, no other data synchronization has been performed between the target client and the server from the first synchronization to the second synchronization. After the server accepts the request for the second synchronization from the target client, the server sends the stored client most-recent change serial number MAXCLT of the target client to the target client, and the target client compares the stored client maximum change serial number MAX with the client most-recent change serial number MAXCLT sent by the server. If the client most-recent change serial number MAXCLT is equal to the client maximum change serial number MAX, then Step S517 is executed to perform the second synchronization based on the current change serial numbers on the server and the target client. If the client most-recent change serial number MAXCLT is not equal to the client maximum change serial number MAX, then Step S518 is performed, for example, to globally synchronize a copy of each second management item on the client based on the current change serial number on the server, i.e., to synchronize the copy of each second management item on the client, so as to avoid loss or errors of data on the client.

Figure 10:
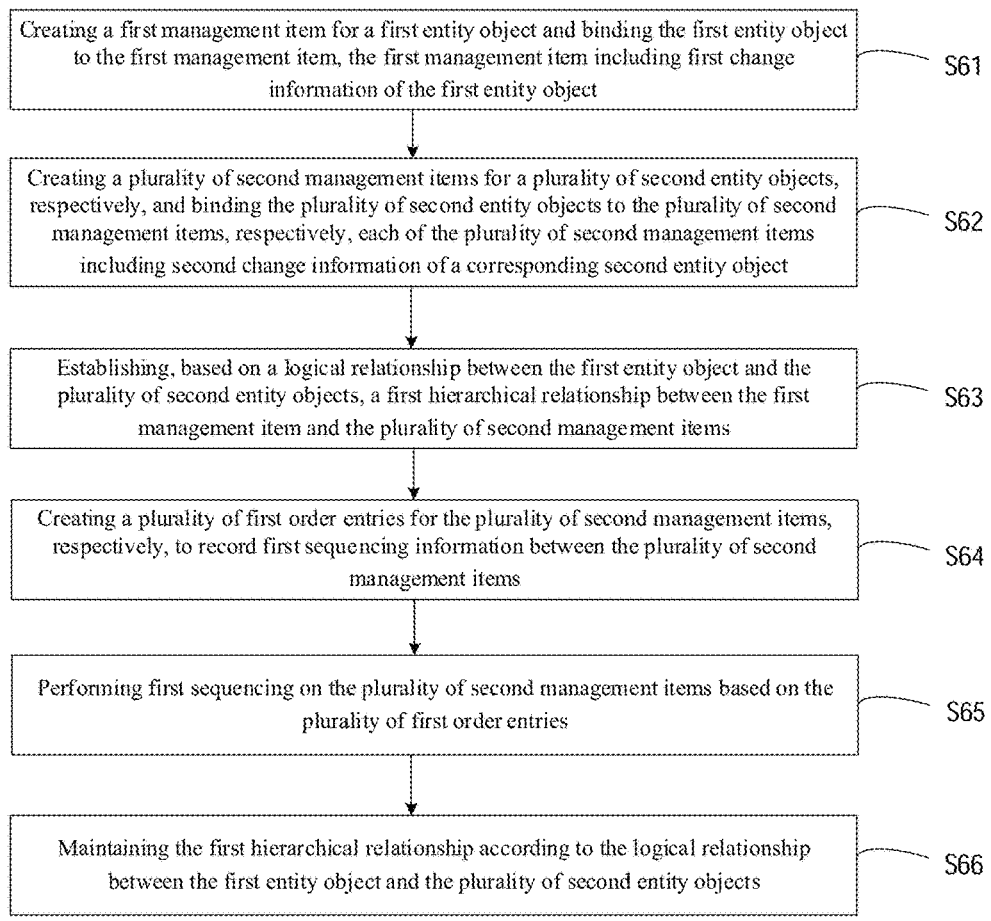
FIG. 10 is further still another schematic flowchart of a data processing method provided by some embodiments of the present disclosure.

FIG. 10 is further still another schematic flowchart of a data processing method provided by some embodiments of the present disclosure. It should be noted that, except for Steps S64 and S65, Steps S61 to S63 and Step S66 are respectively substantially the same as or similar to Steps S11 to S14 of the data processing method shown in FIG. 2A. Specific descriptions of Steps S61 to S63 and Step S66 may be respectively referred to the relevant descriptions corresponding to Steps S11 to S14 shown in FIG. 2A in the embodiments of the data processing method described above, and repetitions will be omitted.

Figure 11:
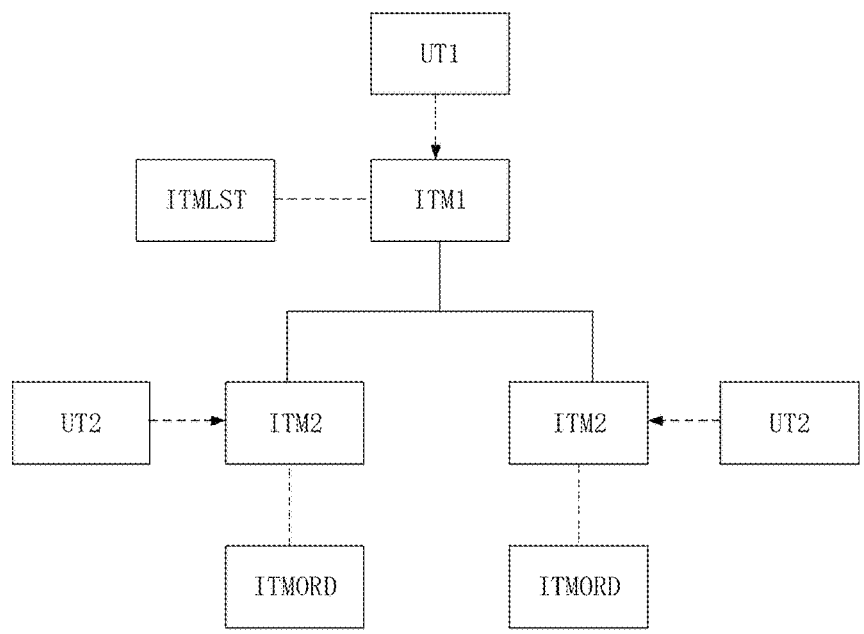
FIG. 11 is further still another schematic diagram of a data structure provided by some embodiments of the present disclosure.

FIG. 11 is further still another schematic diagram of a data structure provided by some embodiments of the present disclosure. It should be noted that the data structure shown in FIG. 11 is substantially the same as or similar to the data structure shown in FIG. 3, except for a first order entry ITMORD and a change information management entry ITMLST. Alternatively, the data structure shown in FIG. 11 is substantially the same as or similar to the data structure shown in FIG. 5, except for a first order entry ITMORD. Repetitions will be omitted.

As shown in FIG. 10, in some embodiments of the present disclosure, the data processing method includes Steps S61 to S64 and Step S66 as below.

Step S61: creating a first management item for a first entity object and binding the first entity object to the first management item, the first management item including first change information of the first entity object.

Step S62: creating a plurality of second management items for a plurality of second entity objects, respectively, and binding the plurality of second entity objects to the plurality of second management items, respectively, each of the plurality of second management items including second change information of a corresponding second entity object.

Step S63: establishing, based on a logical relationship between the first entity object and the plurality of second entity objects, a first hierarchical relationship between the first management item and the plurality of second management items.

Step S64: creating a plurality of first order entries for the plurality of second management items, respectively, to record first sequencing information between the plurality of second management items.

Step S66: maintaining the first hierarchical relationship according to the logical relationship between the first entity object and the plurality of second entity objects.

As shown in FIG. 10, in some embodiments of the present disclosure, after performing Step S64, the data processing method further includes Step S65 as below.

Step S65: performing first sequencing on the plurality of second management items based on the plurality of first order entries.

For example, with reference to FIG. 10 and FIG. 11, the first order entry ITMORD may include first sequencing type information and/or the first sequencing weight information of the corresponding second management item ITM2, so that different sequencing methods may be used for the second management item ITM2 based on information in the first order entry ITMORD of the second management item ITM2 according to different practical needs. For example, the first sequencing may be performed based on the information in the first order entry ITMORD of the second management item ITM2, according to the creation time of the second management item ITM2, or according to the weight of the second entity object UT2 corresponding to the second management item ITM2, and the like. The embodiments of the present disclosure do not impose any specific limitations thereto.

Figure 12:
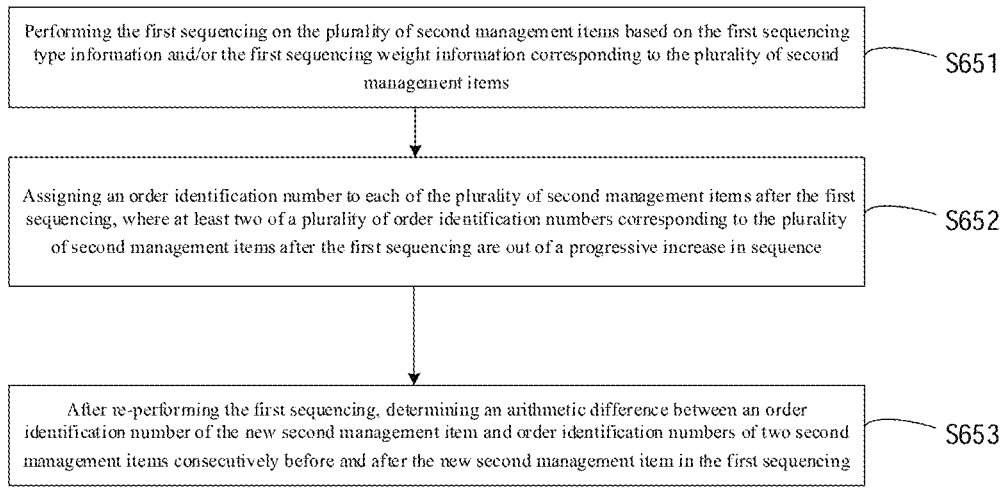
FIG. 12 is a schematic flowchart of Step S65 of a data processing method provided by some embodiments of the present disclosure.

FIG. 12 is a schematic flowchart of Step S65 of a data processing method provided by some embodiments of the present disclosure.

For example, as shown in FIG. 12, in some embodiments of the present disclosure, Step S65 may include Step S651 as below.

StepS651: performing the first sequencing on the plurality of second management items based on the first sequencing type information and/or the first sequencing weight information corresponding to the plurality of second management items.

For example, the first sequencing type information in Step S651 may include creation time, naming characters, update time, or the like of the second management item.

For example, as shown in FIG. 12, in some embodiments of the present disclosure, Step S65 may further include Step S652 as below.

Step S652: assigning an order identification number to each of the plurality of second management items after the first sequencing, where at least two of a plurality of order identification numbers corresponding to the plurality of second management items after the first sequencing are out of a progressive increase in sequence.

For example, the plurality of order identification numbers corresponding to the plurality of second management items are progressively increased at a predetermined interval, and the predetermined interval is greater than one.

For example, as shown in FIG. 12, in some embodiments of the present disclosure, after Step S652, the above Step S65 may further include Step S653 as below.

In response to inserting a new second management item:

Step S653: after re-performing the first sequencing, determining an arithmetic difference between an order identification number of the new second management item and order identification numbers of two second management items consecutively before and after the new second management item in the first sequencing.

For example, if the arithmetic difference is less than or equal to the predetermined interval and is greater than a predetermined offset, the order identification number of the new second management item is determined as a sum of the predetermined offset and the order identification number of the second management item consecutively before the new second management item in the first sequencing. For example, the predetermined offset is greater than or equal to one and is less than the predetermined interval.

For example, the order identification numbers set for the second management items may be processed at a certain predetermined interval. For example, the order identification numbers of the plurality of second management items may be set to 0, 1024, 2048, 3072, etc., and so forth. In this way, when inserting a new second management item between two adjacent second management items, it only needs to notate the order identification number of the inserted second management item as, for example, 512, so that the required amount of computation is reduced while the data processing efficiency is improved.

For example, if each order identification number between two adjacent second management items is occupied, for example, in the case of order identification numbers 0, 1, 2, 8, 256, 512, a new order identification number cannot be added between 0 and 2. If a new second management item is required to be inserted between the two second management items corresponding to the order identification numbers 0 and 1, it needs to perform an offset operation on all the second management items after the second management item corresponding to the order identification number 0 in accordance with a predetermined offset, where the predetermined offset is greater than or equal to 1 and less than the predetermined interval. For example, if the predetermined interval is set to 512 and the predetermined offset is set to 8, during an offset operation, the order identification numbers of the second management items to be offset are sequentially increased in accordance with the predetermined offset until the difference between a next order identification number and a current order identification number is less than the predetermined offset. The above offset operation may be repeatedly performed. For example, in accordance with the above operation method, new order identification numbers are generated as 0, 8, 16, 24, 32, 256, 512.

For example, in some embodiments of the present disclosure, the data processing method further includes Step S71 as below.

Step S71: creating a plurality of second order entries for the plurality of second management items, respectively, to record second sequencing information of the plurality of second management items, the second sequencing information being different from the first sequencing information.

For example, in some embodiments of the present disclosure, the data processing method further includes Step S72 as below.

Step S72: performing second sequencing on the plurality of second management items based on the plurality of second order entries.

For example, the plurality of second order entries include second sequencing type information and/or second sequencing weight information of the corresponding second management items, respectively. Thus, the second sequencing may be performed between the plurality of second order entries based on the second sequencing information that is different from the first sequencing information, so as to obtain an order that is different from the order obtained after the first sequencing, thereby improving the flexibility and diversity of the method of sequencing of the plurality of second order entries to satisfy different practical requirements and to be applicable to different application scenarios.

For example, the step S72 may include: performing the second sequencing on the plurality of second management items based on the second sequencing type information and/or the second sequencing weight information corresponding to the plurality of second management items. Thus, the plurality of second management items after the second sequencing are obtained in this way.

For example, in some embodiments of the present disclosure, the second management item includes node identification information. For example, the node identification information may be used to indicate the first hierarchical relationship between the second management item and the first management item, e.g., to indicate that the second management item is subordinate to the first management item. For example, in the case that the second management item is subordinate to the first management item, the node identification information may include structural information that the second management item points to the first management item.

For example, in some embodiments of the present disclosure, the data processing method further includes: updating the node identification information of the second management item to point to the first management item in response to establishing the first hierarchical relationship between the first management item and the second management item. Thus, the first hierarchical relationship is recorded on the basis of the node identification information of the second management item. For example, if the first hierarchical relationship is changed in a subsequent step, the first hierarchical relationship may be changed by updating the node identification information.

For example, in some embodiments of the present disclosure, Step S11 shown in FIG. 2A may include Step S110 as below.

Step S110: according to a predetermined management item template, creating the first management item based on data of the first entity object.

For example, in some embodiments of the present disclosure, Step S12 shown in FIG. 2A may include Step S120 as below.

Step S120: according to the predetermined management item template, creating the second management item based on data of the second entity object.

For example, the management item template includes an identification information item and a type information item, etc., which may, for example, correspond to the self-identification number (id), and the bound entity object type (entity_type), respectively, the identification information item is used for recording identification information of an entity object bound to the management item, and the type information item is used for recording type information of the entity object bound to the management item. According to needs, the management item template may further include data items corresponding to the bound entity object ID (entity_id), the parent node identification number (parent_id), the status (status or is_deleted), and the like.

For example, after receiving a request to create a management item for a specific entity object, the management item service module is used to generate a new management item and assign a value to the new management item, so that the management item is associated with the entity object.

For example, in some embodiments of the present disclosure, in response to a change in the logical relationship between the first entity object and the second entity object, Step S14 shown in FIG. 2A may include Step S141 as below.

Step S141: modifying the first hierarchical relationship.

Thus, when the logical relationship between the first entity object and the second entity object is changed, the change in the hierarchical relationship or the association relationship between the first entity object and the second entity object may be realized by modifying the first hierarchical relationship between the first management item and the second management item, without accessing or modifying the data of the first entity object and/or the second entity object, thereby reducing the required amount of computation and improving the data processing speed and the data processing efficiency.

For example, the change in the logical relationship may include the first entity object being deleted, so that there is no association relationship between the first entity object and the second entity object. For example, the change in the logical relationship may also include each of the second entity objects being deleted, so that there is no association relationship between the first entity object and any of the second entity objects.

In the case that there is no association relationship between the first entity object and the second entity object as described above, modifying the first hierarchical relationship in Step S141 described above may include: dissolving the first hierarchical relationship. In this way, the association relationship or hierarchical relationship between the first entity object and the second entity object may be dissolved without modifying the data of the first entity object and the second entity object, thereby reducing the amount of computation required when the logical relationship between different entity objects is changed, improving the data processing speed and the data processing efficiency, and also facilitating optimization of the data structure For example, in some embodiments of the present disclosure, in response to an increase or decrease in the number of the second entity objects, Step S14 shown in FIG. 2A may include Step S142 as below.

Step S142: updating the first hierarchical relationship.

For example, when the number of second entity objects is increased, the data structure composed of the first management item and the second management item may be updated by creating a corresponding second management item for the added second entity object and establishing a first hierarchical relationship for the second management item. For example, when the number of second entity objects is reduced, for example, when a specific second entity object is deleted, the first hierarchical relationship between the second management item corresponding to the second entity object (e.g., a to-be-operated second management item) and the first management item is dissolved, and the corresponding second management item is deleted, so that the data structure composed of the first management item and the second management item is updated.

For example, in the case that the first entity object corresponds to the first object collection and the second entity object corresponds to the second object collection, in response to the second entity object being subordinate to the first entity object, the data processing method further includes: modifying the data of the first entity object, so that the second object collection is a sub-collection of the first object collection.

For example, in the case of applying the data processing method according to the embodiments of the present disclosure to a social application, each of the first entity object and the second entity object may correspond to a collection that includes multiple user members in the social application. For example, the first entity object may be a first user collection that includes multiple user members, i.e., the first object collection, and the second entity object may be a second user collection that includes multiple user members, i.e., the second object collection. For example, when the second entity object is subordinate to the first entity object, the second user collection is a sub-collection of the first user collection, that is, all of the user members of the second user collection are included in the user members of the first user collection.

For example, members of the first object collection may remain the same as members of the second object collection.

It should be noted that, in the embodiments of the present disclosure, the flow of the data processing method provided by the respective embodiments of the present disclosure described above may include more or fewer operations, which may be performed sequentially or in parallel. While the flow of the data processing method described above includes multiple operations occurring in a particular order, it should be clearly understood that there is no limitation on the order of the multiple operations. The data processing method described above may be executed once or multiple times in accordance with predetermined conditions.

At least one embodiment of the present disclosure further provides a data processing apparatus, and the data processing apparatus includes a first management item processing unit, a second management item processing unit, a hierarchical relationship establishing unit, and a hierarchical relationship maintaining unit; the first management item processing unit is configured to create a first management item for a first entity object and bind the first entity object to the first management item, where the first management item comprises first change information of the first entity object; the second management item processing unit is configured to create at least one second management item for at least one second entity object, respectively, and bind the at least one second entity object to the at least one second management item, respectively, where each of the at least one second management item comprises second change information of a corresponding second entity object; the hierarchical relationship establishing unit is configured to establish, based on a logical relationship between the first entity object and the at least one second entity object, a first hierarchical relationship between the first management item and the at least one second management item; and the hierarchical relationship maintaining unit is configured to maintain the first hierarchical relationship according to the logical relationship between the first entity object and the at least one second entity object.

In the data processing apparatus according to the embodiments of the present disclosure, by binding the first entity object to the first management item independent of the first entity object, binding the second entity object to the second management item independent of the second entity object, and establishing the first hierarchical relationship between the first management item and the second management item, a change in the association relationship between the first entity object and the second entity object can be realized by modifying the first hierarchical relationship, thereby reducing the amount of computation required when a change is made to a logical relationship between different entity objects and improving the data processing speed and the data processing efficiency, while facilitating optimization of the data structure and improving flexibility of a high-level application.

Figure 13:
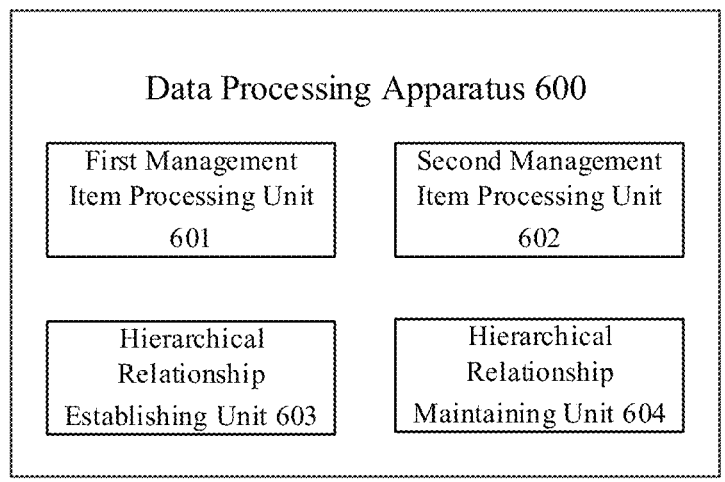
FIG. 13 is a schematic block diagram of a data processing apparatus provided by some embodiments of the present disclosure.

FIG. 13 is a schematic block diagram of a data processing apparatus provided by some embodiments of the present disclosure.

For example, as shown in FIG. 13, a data processing apparatus 600 includes a first management item processing unit 601, a second management item processing unit 602, a hierarchical relationship establishing unit 603, and a hierarchical relationship maintaining unit 604.

The first management item processing unit 601 is configured to create a first management item for a first entity object and bind the first entity object to the first management item, where the first management item includes first change information of the first entity object. For example, the first management item processing unit 601 may perform Step S11 of the data processing method shown in FIG. 2A.

The second management item processing unit 602 is configured to create at least one second management item for at least one second entity object, respectively, and bind the at least one second entity object to the at least one second management item, respectively, where each of the at least one second management item comprises second change information of a corresponding second entity object. For example, the second management item processing unit 602 may perform Step S12 of the data processing method shown in FIG. 2A.

The hierarchical relationship establishing unit 603 is configured to establish, based on a logical relationship between the first entity object and the at least one second entity object, a first hierarchical relationship between the first management item and the at least one second management item. For example, the hierarchical relationship establishing unit 603 may perform Step S13 of the data processing method shown in FIG. 2A.

The hierarchical relationship maintaining unit 604 is configured to maintain the first hierarchical relationship according to the logical relationship between the first entity object and the at least one second entity object. For example, the hierarchical relationship maintaining unit 604 may perform Step S14 of the data processing method shown in FIG. 2A.

For example, the first management item processing unit 601, the second management item processing unit 602, the hierarchical relationship establishing unit 603, and the hierarchical relationship maintaining unit 604 include codes and programs stored on a memory. A processor may perform the codes and programs to realize some functions or all functions of the first management item processing unit 601, the second management item processing unit 602, the hierarchical relationship establishing unit 603, and the hierarchical relationship maintaining unit 604 described above. For example, the first management item processing unit 601, the second management item processing unit 602, the hierarchical relationship establishing unit 603, and the hierarchical relationship maintaining unit 604 may be dedicated hardware devices configured to realize some or all functions of the first management item processing unit 601, the second management item processing unit 602, the hierarchical relationship establishing unit 603, and the hierarchical relationship maintaining unit 604 described above. For example, the first management item processing unit 601, the second management item processing unit 602, the hierarchical relationship establishing unit 603, and the hierarchical relationship maintaining unit 604 may be one circuit board or a combination of multiple circuit boards to realize the functions described above. In the embodiments of the present disclosure, the one circuit board or the combination of multiple circuit boards may include: (1) one or more processors; (2) one or more non-transitory memories connected to the processor(s); and (3) firmware which is executable by the processor(s) and stored on the memory.

It should be noted that the specific descriptions of the first management item processing unit 601, the second management item processing unit 602, the hierarchical relationship establishing unit 603, and the hierarchical relationship maintaining unit 604 may refer to the related descriptions of Step S11 to Step S14 shown in FIG. 2A in the embodiments of the data processing method described above, respectively. Moreover, the data processing apparatus may achieve the technical effects similar to those of the data processing method described above, which will not be described here redundantly.

At least one embodiment of the present disclosure further provides an electronic device. The electronic device includes a processor and a memory. The memory includes one or more computer-executable instructions. The one or more computer-executable instructions are stored on the memory and configured to be executed by the processor. The one or more computer-executable instructions are configured to implement the data processing method provided by any one of the embodiments of the present disclosure.

Figure 14:
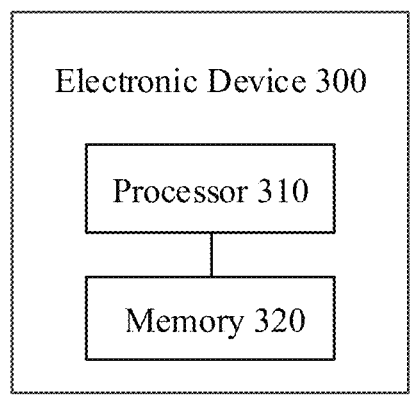
FIG. 14 is a schematic block diagram of an electronic device provided by some embodiments of the present disclosure.

FIG. 14 is a schematic block diagram of an electronic device provided by some embodiments of the present disclosure. As illustrated in FIG. 14, the electronic device 300 includes a processor 310 and a memory 320, which may be configured to implement a client or a server. The memory 320 is configured to store computer-executable instructions (e.g., one or more computer program modules) in a non-transitory manner. The processor 310 is configured to run the computer-executable instructions. The computer-executable instructions, when executed by the processor 310, may implement one or more steps of the data processing method described above, thereby realizing the data processing method described above. The memory 320 and the processor 310 may be interconnected by means of a bus system and/or a connection mechanism in other forms (not shown).

For example, the processor 310 may be a central processing unit (CPU), a graphics processing unit (GPU), or a processing unit in other form having data processing capability and/or program executing capability. For example, the CPU may be an X86 or ARM architecture, or the like. The processor 310 may be a general purpose processor or a special purpose processor, and may control other components in the electronic device 300 to perform desired functions.

For example, the memory 320 may include any combination of one or more computer program products, and the computer program products may include various forms of computer-readable storage media, for example, a volatile memory and/or a non-volatile memory. The volatile memory may include, for example, a random access memory (RAM) and/or a cache, or the like. The non-volatile memory may include, for example, a read only memory (ROM), a hard disk, an erasable programmable read only memory (EPROM), a portable compact disk read only memory (CD-ROM), a USB memory, a flash memory, or the like. One or more computer program modules may be stored on the computer-readable storage medium, and the processor 310 may run the one or more computer program modules, to implement various functions of the electronic device 300. Various applications and various data, as well as various data used and/or generated by the applications may also be stored on the computer-readable storage medium.

It should be noted that, in the embodiments of the present disclosure, the specific functions and technical effects of the electronic device 300 may be with reference to the above description regarding the data processing method, which will not be described here redundantly.

Figure 15:
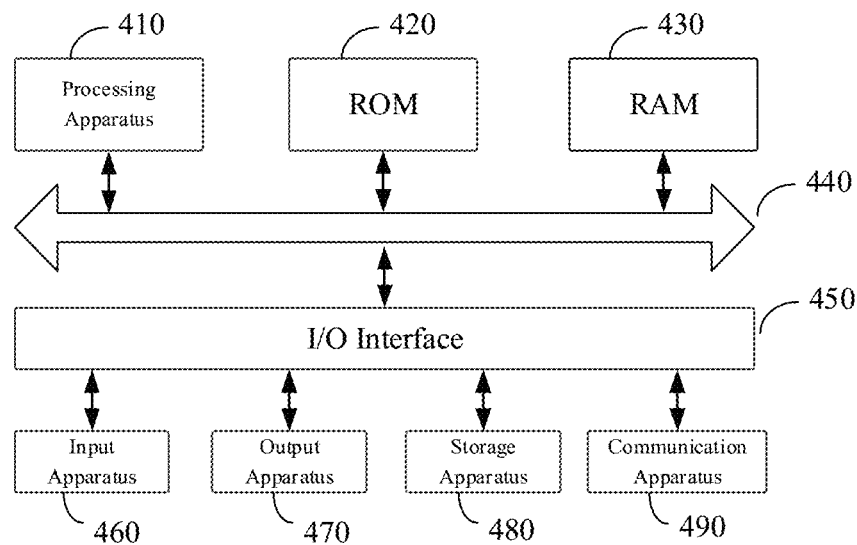
FIG. 15 is another schematic block diagram of an electronic device provided by some embodiments of the present disclosure.

FIG. 15 is a schematic block diagram of another electronic device provided by some embodiments of the present disclosure. The electronic device 400 is, for example, applicable to implementing the data processing method provided by the embodiments of the present disclosure. The electronic device 400 may be a terminal device or the like, and may be configured to implement a client or a server. The electronic device 400 may include but not be limited to mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device, etc., and fixed terminals, such as a digital TV, a desktop computer, a smart home device, etc. It should be noted that the electronic device 400 shown in FIG. 15 is merely an example and will not impose any limitations on the function and the range of use of the embodiments of the present disclosure.

As illustrated in FIG. 15, the electronic device 400 may include a processing apparatus 410 (e.g., a central processing unit, a graphics processing unit, etc.), which may execute various appropriate actions and processing according to a program stored on a read-only memory (ROM) 420 or a program loaded from a storage apparatus 480 into a random access memory (RAM) 430. The random access memory (RAM) 430 further stores various programs and data required for operation of the electronic device 400. The processing apparatus 410, the ROM 420, and the RAM 430 are connected with each other through a bus 440. An input/output (I/O) interface 450 is also connected to the bus 440.

Usually, apparatuses below may be connected to the I/O interface 450: an input apparatus 460 including, for example, a touch screen, a touch pad, a keyboard, a mouse, a camera, a microphone, an accelerometer, a gyroscope, or the like; an output apparatus 470 including, for example, a liquid crystal display (LCD), a speaker, a vibrator, or the like; a storage apparatus 480 including, for example, a magnetic tape, a hard disk, or the like; and a communication apparatus 490. The communication apparatus 490 may allow the electronic device 400 to perform wireless or wired communication with other electronic devices so as to exchange data. Although FIG. 15 shows the electronic device 400 having various apparatuses, it should be understood that, it is not required to implement or have all the apparatuses illustrated, and the electronic device 400 may alternatively implement or have more or fewer apparatuses.

For example, according to the embodiments of the present disclosure, the data processing method described above may be implemented as computer software programs. For example, the embodiments of the present disclosure include a computer program product, including a computer program carried on a non-transitory computer-readable medium, and the computer program includes program codes for executing the data processing method as described above. In such embodiments, the computer program may be downloaded and installed from the network via the communication apparatus 490, or installed from the storage apparatus 480, or installed from the ROM 420. When executed by the processing apparatus 410, the computer program may implement the functions defined in the data processing method provided by the embodiments of the present disclosure.

Figure 16:
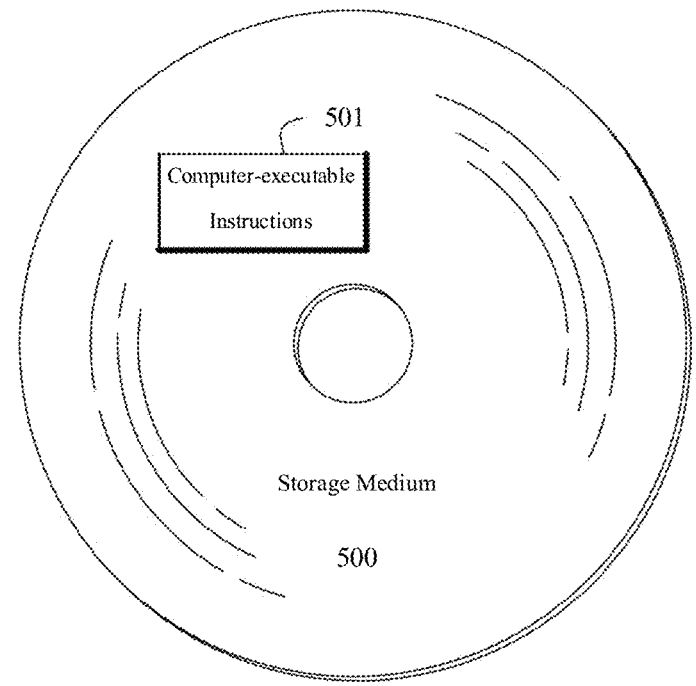
FIG. 16 is a schematic diagram of a storage medium provided by some embodiments of the present disclosure.

FIG. 16 is a schematic diagram of a storage medium provided by some embodiments of the present disclosure. For example, as illustrated in FIG. 16, the storage medium 500 may be a non-transitory computer-readable storage medium, which is configured to store non-transitory computer-executable instructions 501. When executed by the processor, the non-transitory computer-executable instructions 501 may implement the data processing method according to the embodiments of the present disclosure. For example, when executed by the processor, the non-transitory computer-executable instructions 501 may execute one or more steps of the data processing method described above.

For example, the storage medium 500 may be applied to the above-described electronic device. For example, the storage medium 500 may include a memory in the electronic device.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disc read-only memory (CD-ROM), a flash memory, or any combination of the above-described storage media, or other applicable storage media.

For example, the description of the memory in the embodiments of the electronic device may be with reference to illustration of the storage medium 500, and details will not be repeated here. The specific functions and technical effects of the storage medium 500 may be with reference to the above description regarding the data processing method, which will not be described here redundantly.

It should be noted that, in the context of the present disclosure, the computer-readable medium may be a tangible medium that may contain or store programs for use by an instruction execution system, an apparatus, or a device, or for use in combination with an instruction execution system, an apparatus, or a device. The computer-readable medium may be a computer-readable signal medium or a computer-readable storage medium, or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation on the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

According to one or more embodiments of the present disclosure, a data processing method, comprising: creating a first management item for a first entity object and binding the first entity object to the first management item, wherein the first management item comprises first change information of the first entity object; creating at least one second management item for at least one second entity object, respectively, and binding the at least one second entity object to the at least one second management item, respectively, wherein each of the at least one second management item comprises second change information of a corresponding second entity object; establishing, based on a logical relationship between the first entity object and the at least one second entity object, a first hierarchical relationship between the first management item and the at least one second management item; and maintaining the first hierarchical relationship according to the logical relationship between the first entity object and the at least one second entity object.

According to one or more embodiments of the present disclosure, the at least one second entity object is subordinate to the first entity object, and in the first hierarchical relationship, the first management item serves as a parent node, and the at least one second management item serves as at least one child node of the parent node.

According to one or more embodiments of the present disclosure, the first entity object is stored separately from the first management item, and the at least one second entity object is stored separately from the at least one second management item.

According to one or more embodiments of the present disclosure, the data processing method further comprises: updating the first change information of the first management item in response to a change in the first entity object; and/or updating the second change information of each of the at least one second management item in response to a change in each of the at least one second entity object.

According to one or more embodiments of the present disclosure, the first change information comprises a first serial number for recording version change information of the first entity object, and updating the first change information of the first management item comprises: performing an increment operation on the first serial number to update the first serial number.

According to one or more embodiments of the present disclosure, the second change information comprises a second serial number for recording version change information of the corresponding second entity object, and updating the second change information of each of the at least one second management item comprises: determining a target second management item being currently updated among the at least one second management item, and performing an increment operation on a second serial number of the target second management item to update the second serial number of the target second management item.

According to one or more embodiments of the present disclosure, the at least one second entity object comprises a plurality of second entity objects, the corresponding second management item comprises a plurality of second management items, and second serial numbers of the plurality of second management items are different from each other and are not repeatedly used.

According to one or more embodiments of the present disclosure, the data processing method further comprises: creating a change information management entry for the first management item, wherein the change information management entry comprises a change serial number, and the change serial number represents a maximum second serial number among the second serial number of the at least one second management item.

According to one or more embodiments of the present disclosure, performing the increment operation on the second serial number of the target second management item to update the second serial number of the target second management item comprises: obtaining the change serial number, and updating the second serial number of the target second management item to a sum of the change serial number and a predetermined increment.

According to one or more embodiments of the present disclosure, performing the increment operation on the second serial number of the target second management item to update the second serial number of the target second management item further comprises: updating the change serial number to the second serial number of the target second management item after updating the second serial number of the target second management item.

According to one or more embodiments of the present disclosure, the data processing method further comprises: processing, by a server, the first entity object, the first management item, the at least one second entity object, the at least one second management item, and the first hierarchical relationship; and processing, by at least one client, at least one of: a copy of the first entity object, a copy of the first management item, a copy of the at least one second entity object, a copy of the at least one second management item, and a copy of the first hierarchical relationship, wherein the at least one client provides the server with a received instruction to update at least the following by the server: the first entity object, the first management item, the at least one second entity object, the at least one second management item, or the first hierarchical relationship; and the at least one client requests synchronization to the server to update at least one of: the copy of the first entity object, the copy of the first management item, the copy of the at least one second entity object, the copy of the at least one second management item, and the copy of the first hierarchical relationship which are processed by each of the at least one client.

According to one or more embodiments of the present disclosure, the server comprises a first entity object server, a second entity object server, and a management item server; the first entity object server transmits a first creation request to the management item server, and, in response to the first creation request, the management item server creates the first management item for the first entity object and binds the first entity object to the first management item; the second entity object server transmits a second creation request to the management item server, and in response to the second creation request, the management item server creates the at least one second management item for the at least one second entity object, respectively, and binds the at least one second entity object to the at least one second management item, respectively; and the management item server establishes and maintains the first hierarchical relationship based on the logical relationship between the first entity object and the at least one second entity object.

According to one or more embodiments of the present disclosure, during synchronization of the at least one client with the server, in response to the first management item being a parent node of the at least one second management item in the first hierarchical relationship, the first management item is first synchronized with the copy of the first management item, and then the at least one second management item is synchronized with the copy of the at least one second management item.

According to one or more embodiments of the present disclosure, the data processing method further comprises: performing synchronization on the at least one client based on the change information management entry created for the first management item.

According to one or more embodiments of the present disclosure, performing the synchronization on the at least one client based on the change information management entry comprises: determining, among the at least one client, a target client being currently synchronized; accepting a request for first synchronization from the target client; and after the first synchronization for the target client is performed from the server, recording, at the server, a change serial number, which is transmitted to the target client by the server in the first synchronization, as a client most-recent change serial number, and recording, at the target client, the change serial number, which is transmitted to the target client by the server in the first synchronization, as a client maximum change serial number.

According to one or more embodiments of the present disclosure, performing the synchronization on the at least one client based on the change information management entry further comprises: accepting a request for second synchronization from the target client, wherein the second synchronization is temporally adjacent to the first synchronization, transmitting, from the server to the target client, the client most-recent change serial number and a change serial number of the server when receiving the request for the second synchronization, comparing, by the target client, the client most-recent change serial number with the client maximum change serial number, in response to the client most-recent change serial number being equal to the client maximum change serial number, performing the second synchronization on the target client based on the client maximum change serial number and the change serial number transmitted by the server, and in response to the client most-recent change serial number not being equal to the client maximum change serial number, performing the second synchronization on the target client without limitation to the client maximum change serial number.

According to one or more embodiments of the present disclosure, the data processing method further comprises: creating at least one first order entry for the at least one second management item, respectively, to record first sequencing information of the at least one second management item.

According to one or more embodiments of the present disclosure, the data processing method further comprises: performing first sequencing on the at least one second management item based on the at least one first order entry.

According to one or more embodiments of the present disclosure, each of the at least one first order entry comprises first sequencing type information and/or first sequencing weight information of a corresponding second management item; and performing the first sequencing on the at least one second management item based on the at least one first order entry comprises: performing the first sequencing on the at least one second management item based on first sequencing type information and/or first sequencing weight information corresponding to the at least one second management item.

According to one or more embodiments of the present disclosure, the first sequencing type information comprises: creation time, a naming character, or updating time of the corresponding second management item.

According to one or more embodiments of the present disclosure, the at least one second management item comprises a plurality of second management items; and performing the first sequencing on the at least one second management item based on the at least one first order entry further comprises: assigning an order identification number to each of the plurality of second management items after the first sequencing, wherein at least two of a plurality of order identification numbers corresponding to the plurality of second management items after the first sequencing are out of a progressive increase in sequence.

According to one or more embodiments of the present disclosure, the plurality of order identification numbers corresponding to the plurality of second management items are progressively increased at a predetermined interval, and the predetermined interval is greater than one.

According to one or more embodiments of the present disclosure, subsequent to assigning the order identification number to each of the plurality of second management items after the sequencing, performing the first sequencing on the at least one second management item based on the at least one first order entry further comprises: in response to inserting a new second management item, after re-performing the first sequencing, determining an arithmetic difference between an order identification number of the new second management item and order identification numbers of two second management items consecutively before and after the new second management item in the first sequencing, and if the arithmetic difference is less than or equal to the predetermined interval and is greater than a predetermined offset, determining the order identification number of the new second management item as a sum of the predetermined offset and the order identification number of the second management item consecutively before the new second management item in the first sequencing, wherein the predetermined offset is greater than or equal to one and is less than the predetermined interval.

According to one or more embodiments of the present disclosure, the data processing method further comprises: creating at least one second order entry for the at least one second management item, respectively, to record second sequencing information of the at least one second management item, wherein the second sequencing information is different from the first sequencing information.

According to one or more embodiments of the present disclosure, the data processing method further comprises: performing second sequencing on the at least one second management item based on the at least one second order entry.

According to one or more embodiments of the present disclosure, the at least one second order entry comprises second sequencing type information and/or second sequencing weight information of a corresponding second management item; and performing the second sequencing on the at least one second management item based on the at least one second order entry comprises: performing the second sequencing on the at least one second management item based on second sequencing type information and/or second sequencing weight information corresponding to the at least one second management item.

According to one or more embodiments of the present disclosure, the at least one second management item comprises node identification information, and the data processing method further comprises: updating the node identification information of the at least one second management item to point to the first management item, in response to establishing the first hierarchical relationship between the first management item and the at least one second management item.

According to one or more embodiments of the present disclosure, maintaining the first hierarchical relationship according to the logical relationship between the first entity object and the at least one second entity object comprises: modifying the first hierarchical relationship in response to a change in the logical relationship between the first entity object and the at least one second entity object.

According to one or more embodiments of the present disclosure, the change in the logical relationship comprises the first entity object being deleted which causes no association relationship between the first entity object and the at least one second entity object, and modifying the first hierarchical relationship comprises: removing the first hierarchical relationship.

According to one or more embodiments of the present disclosure, the change in the logical relationship comprises each of the at least one second entity object being deleted which causes no association relationship between the first entity object and the at least one second entity object, and modifying the first hierarchical relationship comprises: removing the first hierarchical relationship.

According to one or more embodiments of the present disclosure, maintaining the first hierarchical relationship according to the logical relationship between the first entity object and the at least one second entity object comprises: updating the first hierarchical relationship in response to an increase or a decrease in number of the at least one second entity object.

According to one or more embodiments of the present disclosure, the first entity object corresponds to a first object collection, and the at least one second entity object corresponds to at least one second object collection, respectively; and the data processing method further comprises: in response to the at least one second entity object being subordinate to the first entity object, modifying data of the first entity object to allow the at least one second object collection to be a sub-collection of the first object collection.

According to one or more embodiments of the present disclosure, in response to the at least one second entity object being subordinate to the first entity object, members of the first object collection remain identical to members of the second object collection.

According to one or more embodiments of the present disclosure, a type of the first entity object is different from a type of the at least one second entity object.

According to one or more embodiments of the present disclosure, creating the first management item for the first entity object comprises: according to a predetermined management item template, creating the first management item based on data of the first entity object; and creating the at least one second management item for the at least one second entity object comprises: according to the predetermined management item template, creating the at least one second management item based on data of the at least one second entity object.

According to one or more embodiments of the present disclosure, the management item template comprises an identification information item and a type information item, the identification information item is configured to record identification information of an entity object bound to a management item, and the type information item is configured to record type information of the entity object bound to the management item.

According to one or more embodiments of the present disclosure, an electronic device, comprising: a processor; and a memory, comprising one or more computer-executable instructions, wherein the one or more computer-executable instructions are stored on the memory and configured to be executed by the processor, and the one or more computer-executable instructions are configured to implement the data processing method according to any one of the embodiments of the present disclosure.

According to one or more embodiments of the present disclosure, a storage medium, configured to store non-transitory computer-executable instructions, wherein the non-transitory computer-executable instructions, when executed by a processor, cause the processor to implement the data processing method according to any one of the embodiments of the present disclosure.

According to one or more embodiments of the present disclosure, the at least one second entity object comprises a plurality of second entity objects, the change in the logical relationship comprises a part of the plurality of second entity objects being deleted, which causes a hierarchical relationship between the first management item and a second management item corresponding to the part of the plurality of second entity objects is removed and a hierarchical relationship between the first management item and a second management item corresponding to an other part of the plurality of second entity objects is maintained; and modifying the first hierarchical relationship comprises: removing the hierarchical relationship between the first management item and the second management item corresponding to the part of the plurality of second entity objects, and maintaining the hierarchical relationship between the first management item and the second management item corresponding to the other part of the plurality of second entity objects.

According to one or more embodiments of the present disclosure, the method further comprises at least one of following: updating the first hierarchical relationship in response to the increase in the number of the at least one second entity object comprises: creating a new second management item for an added second entity object and binding the added second entity object to the new second management item; and establishing a hierarchical relationship between the first management item and the new second management item; or updating the first hierarchical relationship in response to the decrease in the number of the at least one second entity object comprises: determining a to-be-operated second management item corresponding to a deleted second entity object; and removing a hierarchical relationship between the first management item and the to-be-operated second management item.

According to one or more embodiments of the present disclosure, updating the first hierarchical relationship in response to the increase in the number of the at least one second entity object further comprises: updating second change information of the new second management item based on the change information management entry of the first management item; and updating the first hierarchical relationship in response to the decrease in the number of the at least one second entity object further comprises: before removing the hierarchical relationship between the first management item and the to-be-operated second management item, updating second change information of the to-be-operated second management item to update the change information management entry of the first management item.

According to one or more embodiments of the present disclosure, updating the first hierarchical relationship in response to the decrease in the number of the at least one second entity object further comprises: deleting the to-be-operated second management item.

According to one or more embodiments of the present disclosure, the first entity object corresponds to a first object collection, and a member of the first object collection is a user; and the at least one second entity object corresponds to at least one second object collection, and a member of the second object collection is a user.

According to one or more embodiments of the present disclosure, an adding operation on users of the second object collection is performed correspondingly by performing an adding operation on users of the first object collection, and/or a removing operation on users of the second object collection is performed correspondingly by performing a removing operation on users of the first object collection.

According to one or more embodiments of the present disclosure, a data processing apparatus, comprising: a first management item processing unit, configured to create a first management item for a first entity object and bind the first entity object to the first management item, wherein the first management item comprises first change information of the first entity object; a second management item processing unit, configured to create at least one second management item for at least one second entity object, respectively, and bind the at least one second entity object to the at least one second management item, respectively, wherein each of the at least one second management item comprises second change information of a corresponding second entity object; a hierarchical relationship establishing unit, configured to establish, based on a logical relationship between the first entity object and the at least one second entity object, a first hierarchical relationship between the first management item and the at least one second management item; and a hierarchical relationship maintaining unit, configured to maintain the first hierarchical relationship according to the logical relationship between the first entity object and the at least one second entity object.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

For the present disclosure, the following statements should be noted.

(1) The accompanying drawings related to the embodiment(s) of the present disclosure involve only the structure(s) in connection with the embodiment(s) of the present disclosure, and other structure(s) can be referred to common design(s).

(2) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. Therefore, the protection scope of the present disclosure should be based on the protection scope of the claims.

The invention claimed is:

1. A data processing method, comprising:
creating a first management item for a first entity object and binding the first entity object to the first management item, wherein the first management item comprises first change information of the first entity object;
creating at least one second management item for at least one second entity object, respectively, and binding the at least one second entity object to the at least one second management item, respectively, wherein each of the at least one second management item comprises second change information of a corresponding second entity object;
establishing, based on a logical relationship between the first entity object and the at least one second entity object, a first hierarchical relationship between the first management item and the at least one second management item; and
maintaining the first hierarchical relationship according to the logical relationship between the first entity object and the at least one second entity object,
wherein maintaining the first hierarchical relationship according to the logical relationship between the first entity object and the at least one second entity object comprises:
modifying the first hierarchical relationship in response to a change in the logical relationship between the first entity object and the at least one second entity object,
wherein the at least one second entity object comprises a plurality of second entity objects, the change in the logical relationship comprises a first part of the plurality of second entity objects being deleted, which causes a hierarchical relationship between the first management item and a second management item corresponding to the part of the plurality of second entity objects is removed and a hierarchical relationship between the first management item and a second management item corresponding to a second part of the plurality of second entity objects is maintained; and
modifying the first hierarchical relationship comprises: removing the hierarchical relationship between the first management item and the second management item corresponding to the first part of the plurality of second entity objects, and maintaining the hierarchical relationship between the first management item and the second management item corresponding to the second part of the plurality of second entity objects.

2. The data processing method according to claim 1, wherein the at least one second entity object is subordinate to the first entity object, and
in the first hierarchical relationship, the first management item serves as a parent node, and the at least one second management item serves as at least one child node of the parent node.

3. The data processing method according to claim 1, wherein the first entity object is stored separately from the first management item, and the at least one second entity object is stored separately from the at least one second management item.

4. The data processing method according to claim 1, further comprising:
updating the first change information of the first management item in response to a change in the first entity object; and/or
updating the second change information of each of the at least one second management item in response to a change in each of the at least one second entity object.

5. The data processing method according to claim 4, wherein the first change information comprises a first serial number for recording version change information of the first entity object, and
updating the first change information of the first management item comprises: performing an increment operation on the first serial number to update the first serial number.

6. The data processing method according to claim 4, wherein the second change information comprises a second serial number for recording version change information of the corresponding second entity object, and
updating the second change information of each of the at least one second management item comprises:
determining a target second management item being currently updated among the at least one second management item, and
performing an increment operation on a second serial number of the target second management item to update the second serial number of the target second management item.

7. The data processing method according to claim 6, wherein the at least one second entity object comprises a plurality of second entity objects, the corresponding second management item comprises a plurality of second management items, and second serial numbers of the plurality of second management items are different from each other and are not repeatedly used.

8. The data processing method according to claim 6, further comprising:
   creating a change information management entry for the first management item, wherein the change information management entry comprises a change serial number, and the change serial number represents a maximum second serial number among the second serial number of the at least one second management item.

9. The data processing method according to claim 8, wherein performing the increment operation on the second serial number of the target second management item to update the second serial number of the target second management item comprises at least one of:
   obtaining the change serial number, and updating the second serial number of the target second management item to a sum of the change serial number and a predetermined increment, or
   updating the change serial number to the second serial number of the target second management item after updating the second serial number of the target second management item.

10. The data processing method according to claim 1, further comprising:
   processing, by a server, the first entity object, the first management item, the at least one second entity object, the at least one second management item, and the first hierarchical relationship; and
   processing, by at least one client, at least one of: a copy of the first entity object, a copy of the first management item, a copy of the at least one second entity object, a copy of the at least one second management item, and a copy of the first hierarchical relationship,
   wherein the at least one client provides the server with a received instruction to update at least the following by the server: the first entity object, the first management item, the at least one second entity object, the at least one second management item, or the first hierarchical relationship; and
   the at least one client requests synchronization to the server to update at least one of: the copy of the first entity object, the copy of the first management item, the copy of the at least one second entity object, the copy of the at least one second management item, and the copy of the first hierarchical relationship which are processed by each of the at least one client.

11. The data processing method according to claim 10, further comprising:
   performing synchronization on the at least one client based on the change information management entry created for the first management item.

12. The data processing method according to claim 1, wherein the at least one second management item comprises a plurality of second management items; and
   the data processing method further comprises:
   assigning an order identification number to each of the plurality of second management items after first sequencing, wherein a plurality of order identification numbers corresponding to the plurality of second management items are progressively increased at a predetermined interval, and the predetermined interval is greater than one.

13. The data processing method according to claim 1, wherein the at least one second management item comprises node identification information, and the data processing method further comprises:
   updating the node identification information of the at least one second management item to point to the first management item, in response to establishing the first hierarchical relationship between the first management item and the at least one second management item.

14. The data processing method according to claim 1, wherein the change in the logical relationship comprises at least one of: the first entity object being deleted which causes no association relationship between the first entity object and the at least one second entity object, or each of the at least one second entity object being deleted which causes no association relationship between the first entity object and the at least one second entity object; and
   modifying the first hierarchical relationship comprises: removing the first hierarchical relationship.

15. The data processing method according to claim 1, wherein maintaining the first hierarchical relationship according to the logical relationship between the first entity object and the at least one second entity object comprises at least one of:
   updating the first hierarchical relationship in response to an increase in number of the at least one second entity object, wherein updating the first hierarchical relationship in response to the increase in the number of the at least one second entity object comprises: creating a new second management item for an added second entity object and binding the added second entity object to the new second management item, and establishing a hierarchical relationship between the first management item and the new second management item; or
   updating the first hierarchical relationship in response to a decrease in the number of the at least one second entity object, wherein updating the first hierarchical relationship in response to the decrease in the number of the at least one second entity object comprises: determining a second management item corresponding to a deleted second entity object, and removing a hierarchical relationship between the first management item and the second management item.

16. The data processing method according to claim 15, wherein updating the first hierarchical relationship in response to the increase in the number of the at least one second entity object further comprises: updating second change information of the new second management item based on the change information management entry of the first management item; and
   updating the first hierarchical relationship in response to the decrease in the number of the at least one second entity object further comprises: before removing the hierarchical relationship between the first management item and the second management item, updating second change information of the second management item to update the change information management entry of the first management item.

17. The data processing method according to claim 1, wherein the first entity object corresponds to a first object collection, and the at least one second entity object corresponds to at least one second object collection, respectively; and the data processing method further comprises:
in response to the at least one second entity object being subordinate to the first entity object, modifying data of the first entity object to allow the at least one second object collection to be a sub-collection of the first object collection.

18. The data processing method according to claim 1, wherein the first entity object corresponds to a first object collection, and a member of the first object collection is a user; and
the at least one second entity object corresponds to at least one second object collection, and a member of the second object collection is a user.

19. The data processing method according to claim 18, wherein at least one as follows is applied:
an adding operation on users of the second object collection is performed correspondingly by performing an adding operation on users of the first object collection, or
a removing operation on users of the second object collection is performed correspondingly by performing a removing operation on users of the first object collection, or
a type of the first entity object is different from a type of the at least one second entity object.

20. The data processing method according to claim 1, wherein creating the first management item for the first entity object comprises: according to a predetermined management item template, creating the first management item based on data of the first entity object; and
creating the at least one second management item for the at least one second entity object comprises: according to the predetermined management item template, creating the at least one second management item based on data of the at least one second entity object,
wherein the management item template comprises an identification information item and a type information item, the identification information item is configured to record identification information of an entity object bound to a management item, and the type information item is configured to record type information of the entity object bound to the management item.

21. A data processing apparatus, comprising:
a processor; and
a memory, comprising one or more computer-executable instructions,
wherein the processor comprises:
a first management item processing unit, which creates a first management item for a first entity object and bind the first entity object to the first management item, wherein the first management item comprises first change information of the first entity object;
a second management item processing unit, which creates at least one second management item for at least one second entity object, respectively, and bind the at least one second entity object to the at least one second management item, respectively, wherein each of the at least one second management item comprises second change information of a corresponding second entity object;
a hierarchical relationship establishing unit, which establishes, based on a logical relationship between the first entity object and the at least one second entity object, a first hierarchical relationship between the first management item and the at least one second management item; and a hierarchical relationship maintaining unit, which maintains the first hierarchical relationship according to the logical relationship between the first entity object and the at least one second entity object,
wherein maintaining the first hierarchical relationship according to the logical relationship between the first entity object and the at least one second entity object comprises:
modifying the first hierarchical relationship in response to a change in the logical relationship between the first entity object and the at least one second entity object,
wherein the at least one second entity object comprises a plurality of second entity objects, the change in the logical relationship comprises a first part of the plurality of second entity objects being deleted, which causes a hierarchical relationship between the first management item and a second management item corresponding to the part of the plurality of second entity objects is removed and a hierarchical relationship between the first management item and a second management item corresponding to a second part of the plurality of second entity objects is maintained; and
modifying the first hierarchical relationship comprises: removing the hierarchical relationship between the first management item and the second management item corresponding to the first part of the plurality of second entity objects, and maintaining the hierarchical relationship between the first management item and the second management item corresponding to the second part of the plurality of second entity objects.

22. An electronic device, comprising:
a processor; and
a memory, comprising one or more computer-executable instructions,
wherein the one or more computer-executable instructions are stored on the memory and configured to be executed by the processor, and the one or more computer-executable instructions are configured to implement the data processing method according to claim 1.

23. A non-transitory storage medium, which stores computer-executable instructions, wherein the computer-executable instructions, when executed by a processor, cause the processor to:
create a first management item for a first entity object and binding the first entity object to the first management item, wherein the first management item comprises first change information of the first entity object;
create at least one second management item for at least one second entity object, respectively, and binding the at least one second entity object to the at least one second management item, respectively, wherein each of the at least one second management item comprises second change information of a corresponding second entity object;
establish, based on a logical relationship between the first entity object and the at least one second entity object, a first hierarchical relationship between the first management item and the at least one second management item; and
maintain the first hierarchical relationship according to the logical relationship between the first entity object and the at least one second entity object,
wherein maintaining the first hierarchical relationship according to the logical relationship between the first entity object and the at least one second entity object comprises:

modifying the first hierarchical relationship in response to a change in the logical relationship between the first entity object and the at least one second entity object, wherein the at least one second entity object comprises a plurality of second entity objects, the change in the logical relationship comprises a first part of the plurality of second entity objects being deleted, which causes a hierarchical relationship between the first management item and a second management item corresponding to the part of the plurality of second entity objects is removed and a hierarchical relationship between the first management item and a second management item corresponding to a second part of the plurality of second entity objects is maintained; and modifying the first hierarchical relationship comprises: removing the hierarchical relationship between the first management item and the second management item corresponding to the first part of the plurality of second entity objects, and maintaining the hierarchical relationship between the first management item and the second management item corresponding to the second part of the plurality of second entity objects.

* * * * *